US00RE47460E

(19) United States
(12) Reissued Patent
Vinther et al.

(10) Patent Number: US RE47,460 E
(45) **Date of Reissued Patent: *Jun. 25, 2019**

(54) CONTROLLED-IMPEDANCE CABLE TERMINATION USING COMPLIANT INTERCONNECT ELEMENTS

(71) Applicant: Ardent Concepts, Inc., Hampton, NH (US)

(72) Inventors: Gordon A Vinther, Hampton, NH (US); Sergio Diaz, Cambridge, MA (US)

(73) Assignee: Ardent Concepts, Inc., Hampton, NH (US)

( * ) Notice: This patent is subject to a terminal disclaimer.

(21) Appl. No.: 15/897,677

(22) Filed: Feb. 15, 2018

Related U.S. Patent Documents

Reissue of:
(64) Patent No.: 9,160,151
Issued: Oct. 13, 2015
Appl. No.: 14/534,241
Filed: Nov. 6, 2014

U.S. Applications:
(60) Division of application No. 15/248,438, filed on Aug. 26, 2016, which is an application for the reissue of
(Continued)

(51) Int. Cl.
*H01R 12/00* (2006.01)
*H02G 1/14* (2006.01)
(Continued)

(52) U.S. Cl.
CPC ..... *H02G 1/14* (2013.01); *H01R 12/75* (2013.01); *H01R 24/38* (2013.01)

(58) Field of Classification Search
CPC ..... H01R 23/7073; H01R 13/648; H01R 13/5208
(Continued)

(56) References Cited

U.S. PATENT DOCUMENTS 4,734,046 A 3/1988 McAllister et al.
4,764,722 A 8/1988 Coughlin et al.
(Continued)

OTHER PUBLICATIONS

Extended European Search Report for European Patent Application No. 12843021.2, Jul. 14, 2016.
(Continued)

*Primary Examiner* — Tuan H Nguyen
(74) *Attorney, Agent, or Firm* — Altman & Martin; Steven K Martin

(57) ABSTRACT

[An apparatus for terminating a controlled-impedance cable using compliant electrical contacts to provide an interface to another device. The terminator includes an anchor block for securing the cable. Optionally, the anchor block is electrically non-conductive. A conductive ferrule is installed on the cable shield and the cable end is dressed. The ferrule/cable assembly is installed in a through hole in the anchor block so the cable end is flush with the anchor block face. An insulating or conductive plate mounted to the anchor block holds the signal contact that electrically connects the center conductor to the device and optional ground contacts that electrically connect the ferrule to the device. The ground contacts surround the signal contact in a pattern that closely mimics the impedance environment of the cable. When using a conductive plate, the signal contact is insulated from the plate by an insulating centering plug or a non-conductive coating.] *An apparatus for terminating a controlled-impedance cable using compliant electrical contacts to provide an interface to another device. The terminator includes an anchor block for securing the cable. An electrically-conductive ferrule is installed on the cable shield and the cable end is dressed. The ferrule/cable assembly is installed in a through hole in the anchor block so that the cable end is flush with the anchor block face. An electrically-conductive plate mounted to the anchor block face holds the signal*
(Continued)

*contact that electrically connects the center conductor to the device and optional ground contacts that electrically connect the ferrule to the device. The signal contact is insulated from the plate by an insulating plug. The ground contacts surround the signal contact in a pattern that closely mimics the impedance environment of the cable.*

16 Claims, 29 Drawing Sheets

Related U.S. Application Data

Pat. No. 9,160,151, which is a continuation-in-part of application No. 14/238,215, filed as application No. PCT/US2012/061662 on Oct. 24, 2012, now Pat. No. 8,926,342.

(60) Provisional application No. 61/550,543, filed on Oct. 24, 2011.

(51) Int. Cl.
*H01R 12/75* (2011.01)
*H01R 24/38* (2011.01)

(58) Field of Classification Search
USPC ..... 439/79, 80, 97, 100, 660
See application file for complete search history.

(56) References Cited

U.S. PATENT DOCUMENTS 4,941,831 A 7/1990 Tengler
5,308,250 A 5/1994 Walz
5,886,590 A 3/1999 Quan et al.
6,022,227 A * 2/2000 Huang ..... 439/79
6,366,185 B1 4/2002 Keesey et al.
6,447,328 B1 9/2002 Feldman
6,515,499 B1 2/2003 Parrish et al.
6,638,104 B2 * 10/2003 Hashimoto et al. ..... 439/567
6,686,732 B2 2/2004 Parrish
6,787,709 B2 9/2004 Vinther
6,824,427 B1 11/2004 Feldman et al.
6,909,056 B2 6/2005 Vinther
6,951,482 B1 10/2005 Miller et al.
7,126,062 B1 10/2006 Vinther et al.
7,544,093 B2 6/2009 Soubh et al.
RE41,663 E 9/2010 Vinther
2002/0050388 A1 5/2002 Simpson
2003/0117129 A1 6/2003 Parrish
2004/0200633 A1 10/2004 Vinther
2005/0032433 A1 2/2005 Lee et al.
2005/0085103 A1 4/2005 Driscoll et al.
2005/0101167 A1 5/2005 Weiss et al.
2005/0208828 A1 9/2005 Miller et al.
2006/0071680 A1 * 4/2006 Behziz ..... G01R 31/2889 324/756.07
2009/0023333 A1 1/2009 Soubh et al.
2010/0029130 A1 2/2010 Kretz et al.
2011/0034081 A1 2/2011 Feldman et al.

OTHER PUBLICATIONS

International Search Report and Written Opinion for PCT Application No. PCT/US2012/061662, Mar. 25, 2013.

* cited by examiner

CONTROLLED-IMPEDANCE CABLE TERMINATION USING COMPLIANT INTERCONNECT ELEMENTS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This application is a Divisional Reissue Application of Reissue application Ser. No. 15/248,438 filed on Aug. 26, 2016, both of which are Reissue Applications of U.S. Pat. No. 9,160,151 issued on Oct. 13, 2015 from application Ser. No. 14/534,241 filed on Nov. 6, 2014. The entirety of the above-mentioned patent applications are hereby incorporated by reference herein and made a part of this application.*

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention relates to electrical cable terminations, more particularly, to controlled impedance cable terminations which are generally used to transmit high-frequency signals in electronic equipment.

2. Description of the Related Art

The purpose of a cable termination is to provide an interconnect from the cable to the electrical device and to provide a separable electrical interconnection between the cable and its operating environment. The characteristic of separability means that the cables are not interconnected by permanent mechanical means, such as soldering or bonding, but by temporary mechanical means.

Currently cables are terminated using a conventional type connector which is also controlled-impedance, such as an SMA (SubMiniature Version A) connector, or the cables are soldered to a printed circuit board (PCB) which is then separably connected to the working environment. The SMA connectors, while being generally the same impedance environment as the cable, have impedance mismatches which cause high-frequency attenuation at the point of interface between the cable and the connector and the connector and its working environment, such as like a PCB. Additionally, these cable terminations often require through holes in PCB's for mounting and, consequently, it can be difficult to design the best possible controlled impedance environment. These types of cable terminations are generally for a single cable and require a substantial amount of PCB area to terminate, thus decreasing the density capability of connections.

Another form of prior art is a system which uses two independent parts to mate several cables to its electrical environment. This system uses one part that is generally soldered to a printed circuit board and another part that is generally mated to several cables. The two pieces can be plugged together to form the controlled impedance interconnection. These systems are better-controlled impedance environments but are limited in the densities at which the cables can be used. That is, the cables require a minimum space between them to achieve the controlled impedance environment and thus only a small number of cables can be terminated in a given area.

Another form of prior art, disclosed in U.S. Pat. No. 7,544,093, is a system which employs removable cables that are held to the device by means of a spring. The cable has a terminal end which makes the signal conductor protrude from the cable terminal end. The terminal is then pressed to the device by means of a spring and the ground shield of the cable is connected to the device by a conductive rubber ground shield that shorts the terminal ground to the device ground.

BRIEF SUMMARY OF THE INVENTION

The present invention is an apparatus and method for terminating a controlled-impedance cable that uses a compliant contact element at the point of termination minimizes detrimental electrical effects of the termination.

The present invention includes a cable terminator that employs compliant electrical contacts to provide an interface between the controlled-impedance cable (hereinafter, simply "cable") and another device. The assembly is removably attached to the electrical device by a compression force in a direction of compression typically provided by jack screws that may not compress the assembly and device together linearly. Compliant contacts compensate for noncoplanarities between the conduction points of the electrical device.

Each embodiment of the terminator includes an anchor block for securing the cable, one or more compliant signal contacts for making the electrical connection between the cable center conductor(s) and the electrical device, optional compliant ground contacts for making the electrical connection between the cable shield and the ground plane of the device, and a plate mounted to the anchor block that holds the contacts.

The anchor block can be either electrically conductive or nonconductive. When conductive, the ground shield of all of the cables are electrically connected to the anchor block. The present invention contemplates several different methods to accomplish this including soldering the cable ground shield, crimping the ground shield, potting with a conductive adhesive, insert molding, press fitting a rigidized ground shield, threading, and twist-lock. Once the cables are anchored in the anchor block, the anchor block face and cable ends are dressed to make a reliable electrical contact with compliant contacts. Dressing may include polishing by some mechanical means, such as by milling, grinding, or sanding, in order to make sure that the cable center conductor is positioned at a known depth with respect to the anchor block face.

When the anchor block is nonconductive, a conductive ferrule is installed on the ground shield of each cable. The cable ends are dressed to make a reliable electrical contact with compliant contacts and the ferrule/cable assemblies are installed into holes in the anchor block. The present invention contemplates several different methods to accomplish this including, press fitting, threading, and twist-lock.

Example compliant contacts for use with the present invention include spring probes, electrically-conductive rubber contacts, fuzz button contacts, stamped metal contacts, chemically etched contacts, and skewed coil contacts.

The plate holds the contacts. Features of the plate include a face surface that abuts the anchor block face, a device surface that generally abuts the device, and at least one through aperture for the contacts. Each aperture has an anchor block face opening and a device face opening. The apertures for the signal contacts are aligned with the corresponding cable hole in the anchor block.

The cable center conductor is connected to the signal conduction point of the electrical device by the compliant signal contact. In most configurations, the signal contacts are surrounded by a number of ground contacts that connect either the conductive anchor block or the cable shield to the device in a pattern that closely mimics the impedance environment of the cable. The impedance of the system can be changed by changing the position of the ground contacts with respect to the signal contact or by changing the insulating material.

The skewed coil contact is captured in a through aperture in the plate. The aperture has a larger center section that narrows to a smaller block opening at the side adjacent to the anchor block and to a smaller device opening at the other end. The length of the contact leads is such that the leads extend from the openings. Alternatively, the block opening is as wide as the center section. Optionally, the contact area between the center conductor and device and the corresponding contact lead can be increased by a pair of conductive bosses that the contact is captured in that is as wide as the cable center conductor. Optionally, the remaining space of the aperture is filled with a compliant, electrically conductive elastomer that adds resiliency and aids in electrically shorting the coil loops.

The fuzz button contact is cylindrical and forced into an aperture that is narrower at the center than the ends. The contact ends extend from the plate.

The conductive rubber contact for the signal contact can be cylindrical with a centrally-located annular depression that fits on an annular protrusion in the aperture. The contact ends extend from the plate. The conductive rubber contact for the ground contact can be the same structure as the signal contact or can be circular, surrounding the signal contact.

The etched or stamped contact is a strip of conductive material in a C shape that is captured in a C-shaped aperture.

The electrical connection between the center conductor and the signal contact and the electrical connection between the ground block/cable shield ferrule and the ground contacts are compression connections. With the contacts installed in the plate, the plate is mounted to the anchor block with mechanical attachments, thereby forcing the end of the signal contact against the end of the center conductor and the ends of the ground contacts against the anchor block/cable shield ferrule. Alternatively, the electrical connection between the center conductor and the signal contact is a solder connection. Alternatively, the end of the center conductor is formed into a compliant spring like the skewed coil contact.

The plate can be either insulating or conductive. The insulating plate is made of a non-electrically-conductive material. A conductive plate is preferably composed of an electrically-conductive metal that couples the ground contacts, thereby providing more precise impedance matching to the signal contact. Alternatively, the conductive plate is composed of a non-conductive material plated with a conductive coating. The signal contact is insulated from the conductive plate by an insulating centering plug or a non-conductive coating.

Alternatively, the signal contact aperture is within a conductive boss. The boss is surrounded by an insulating annulus that insulates the boss from the conductive plate.

Also disclosed is a method and apparatus for assembling cables to the anchor block so that the cables are the same length to within a very small tolerance. To facilitate the method, a soldering fixture is used that has a frame, a connector jig, a block jig, and legs. The frame is generally rectangular and stands vertically. The connector jig is mounted to the lower cross piece of the frame. The block jig is mounted to the upper cross piece of the frame. Four legs extend from the bottom corners of the frame in generally opposite directions at an angle of at least 10° from horizontal so that they prevent the frame from falling over but allow the user to tilt the frame.

The connector jig locks the cable connectors at a fixed distance away from where the other end of the cable will be soldered to the anchor block. The connector jig locks the connectors in an upwardly open arc so that the cables are the same length to the anchor block.

The anchor block is secured to the block jig, face up, which is secured to the upper cross piece. A tensioning plate is mounted to the upper cross piece. Jack screws are threaded into holes at the end of the tensioning plate.

The cable sheath is stripped and the stripped portion is fed through the hole in the anchor block and a corresponding cable hole in the tensioning plate. A coil spring is placed on each cable and a collar is tightly secured to the cable.

After putting the connectors in the connector jig, the jack screws are tightened until there is adequate tension on the cables. Each cable shield is soldered to the anchor block. The angled legs allow the user to tilt the fixture for easier access to each side of the anchor block. After the solder and anchor block have cooled sufficiently, the jack screws are loosened, and the collars, springs, and tensioning plate are removed. The anchor block is removed from the frame and the connectors are removed from the connector jig.

The anchor block face is finished smooth and evenly flat by sanding, milling, planing, skiving, broaching, or any other appropriate method.

Objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION OF THE INVENTION

The present application hereby incorporates by reference in its entirety U.S. patent application Ser. No. 14/238,215, on which this application is based.

The present invention is an apparatus and method for terminating a controlled-impedance cable that minimizes detrimental electrical effects of the termination by using a compliant or compressible contact element at the point of termination. With the present invention, impedance mismatches are minimized, allowing the cable to be more useful in high-frequency signal ranges. The present invention can be used with any cable structure where the impedance between the inner conductor(s) and the ground shield is controlled.

In addition, the present invention increases the density at which the controlled-impedance cables can be used. That is, with the present invention, more cables can be terminated in a given amount of space than with terminations of the prior art. Further, the interface between the components of the present invention may not require through-hole mounting, which may further enhance density capability.

The present invention calls for proper dressing of the cable end so that small, compliant contacts can be used for separably interconnecting the controlled-impedance cables to whatever electrical device the user desires. A prime example is connecting two printed circuit boards which must communicate with each other at high frequency, such as connecting a computer central processing PCB with its random access memory PCB or another central processing PCB.

Figure 1:
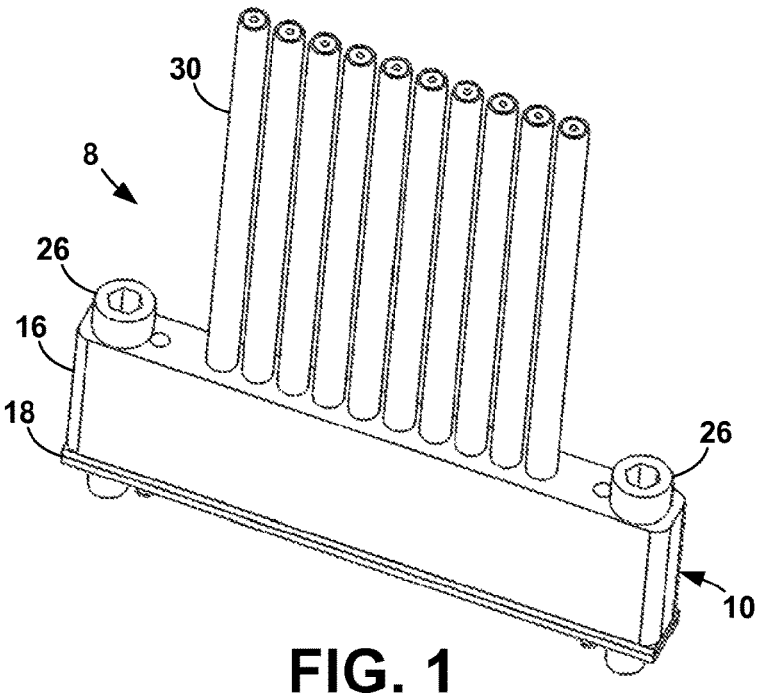
FIG. 1 is an isometric view of the cable termination assembly of the present invention for use with coaxial cables.
Figure 2:
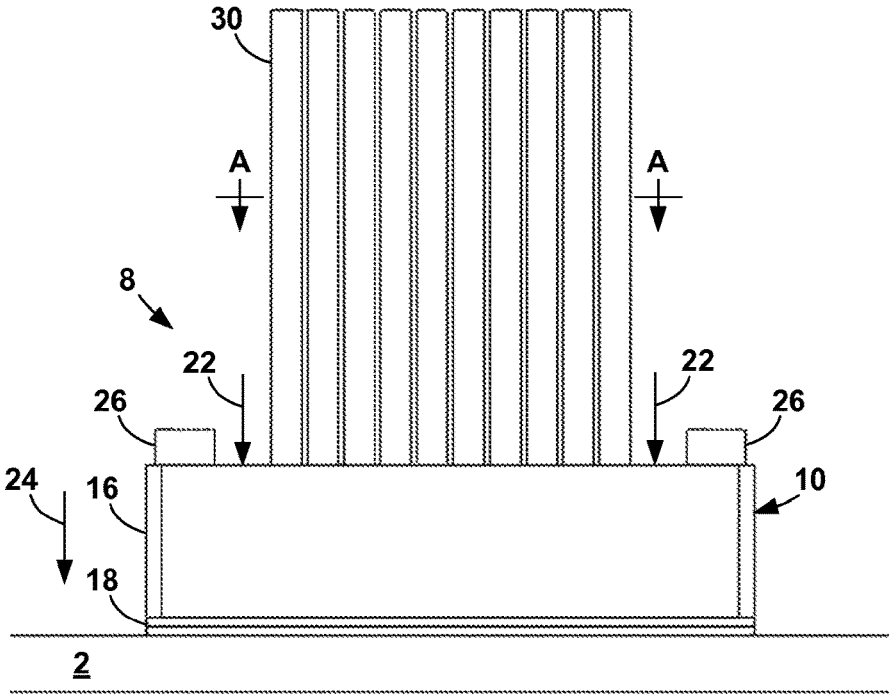
FIG. 2 is a front view of the cable termination assembly of FIG. 1 connected to a device.
Figure 3:
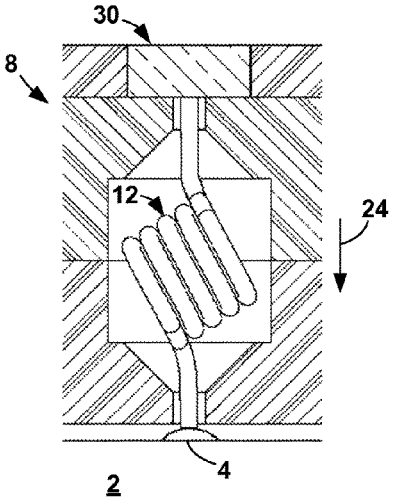
FIG. 3 is a cross-sectional detail view of the cable termination assembly connected to a device.
Figure 4:
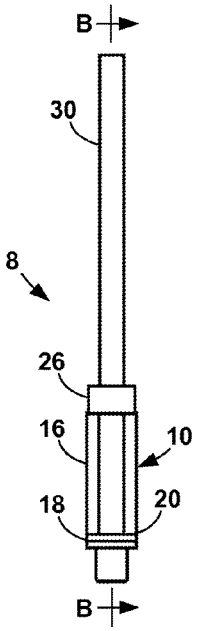
FIG. 4 is a side view of the cable termination assembly of FIG. 1.

As shown in FIGS. 1-11, the present invention includes a cable terminator 10 that employs compliant electrical contacts 12, 14 to provide an interface between the controlled-impedance cable (hereinafter, simply "cable") 30 and another device 2, typically an integrated circuit (IC) or a printed circuit board (PCB). The terminator 10 is installed on the cable 30 as described below. The combination of terminator 10 and cable(s) is referred to as the cable termination assembly 8. As shown in FIGS. 2 and 3, the assembly 8 is removably attached to the electrical device 2 by a compression force 22 in a direction of compression 24. Typically, jack screws 26 provide the compression force 22. Jack screws 26 may not compress the assembly 8 and the electrical device 2 together linearly. Compliant contacts 12, 14 facilitate an adequate connection between the cables 30 and the electrical device 2, compensating for noncoplanarities in the conduction points 4 of the electrical device 2.

The present invention is for use with controlled-impedance cables having one or more center conductors. A coaxial cable 30 has a center conductor 32 surrounded by a dielectric 34 with a ground reference shield 36 outside the dielectric 34. Optionally, a sheath 38 covers the shield 36. A twin-axial cable 30 has two center conductors 32 surrounded by a dielectric 34 with a ground reference shield 36 outside the dielectric 34 and a sheath 38 covering the shield 36. Cables with more than two center conductors are available. Although not specifically described, the present invention can be adapted to accommodate cables having more than two center conductors.

The terminator 10 of the present invention has several embodiments. Each embodiment includes an anchor block 16 for securing the cable 30, one or more compliant signal contacts 12 for making the electrical connection between the cable center conductor(s) 32 and the electrical device 2, optional compliant ground contacts 14 for making the electrical connection between the cable shield 36 and the ground plane of the device 2, and a plate 18 mounted to the anchor block 16 that holds the contacts 12, 14.

Figure 5:
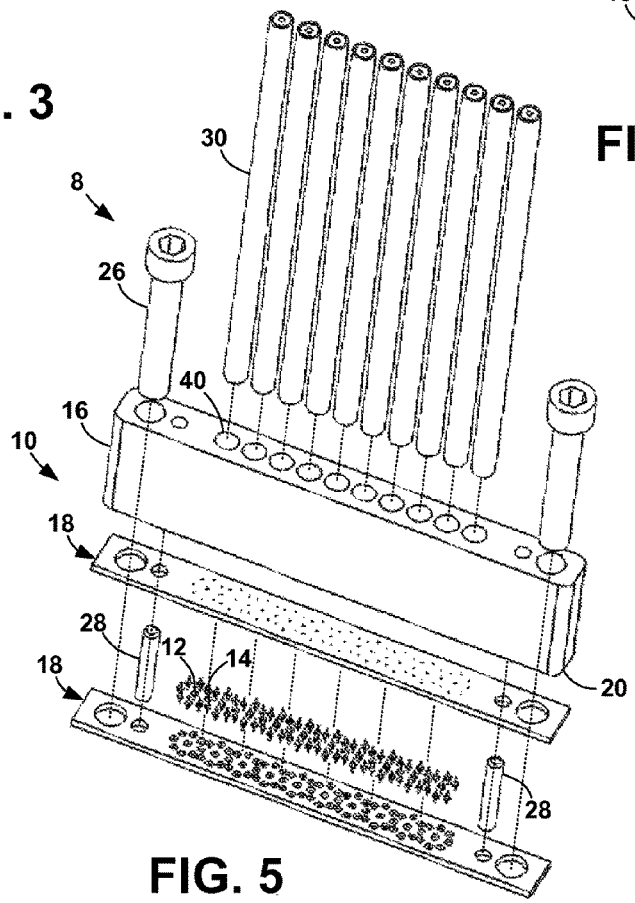
FIG. 5 is an exploded view of the cable termination assembly of FIG. 1 with a conductive anchor block.
Figure 6:
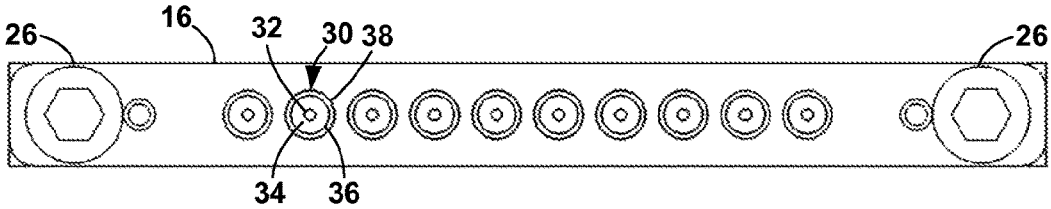
FIG. 6 is a top cross-sectional view of the cable termination assembly of FIG. 2 taken along the line A-A.
Figure 7:
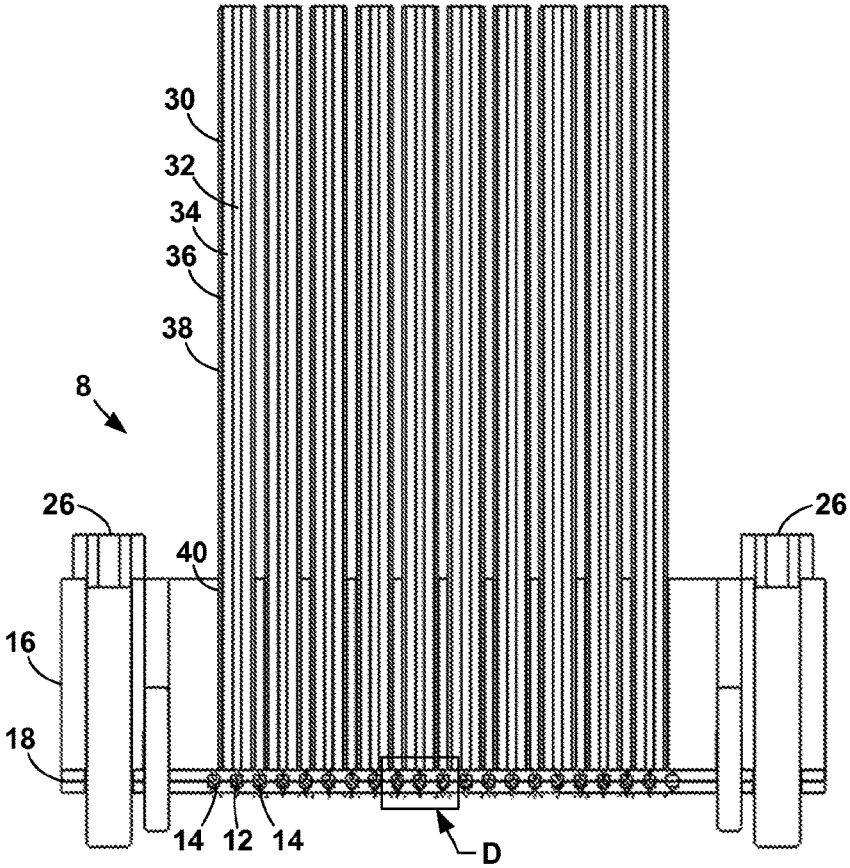
FIG. 7 is a front cross-sectional view of the cable termination assembly of FIG. 4 with a conductive anchor block taken along the line B-B.

In one embodiment, the anchor block 16 is conductive and provides a common ground for the cables 30, as in FIG. 5. The ground shields 36 of all of the cables 30 are electrically connected to the anchor block 16. The present invention contemplates several different methods to accomplish this. The ground shield 36 may be soldered into a hole 40 in anchor block 16. The cable sheath 38 is stripped back at least the length of the anchor block hole 40. The cable 30 is inserted into the hole 40 up to the end of the sheath 38 and the shield 36 is soldered to the anchor block 16.

Alternatively, the cable 30 may be crimped into the anchor block hole 40. After the sheath 38 is stripped back, the cable 30 is inserted into the hole 40. The hole 40 may have the path through which the cable 30 runs geometrically altered after insertion of the cable 30 to a point where the size of the path is smaller than the size of the cable 30, thereby anchoring the cable 30 to the anchor block 16 and electrically connecting the shield 36 to the anchor block 16.

Other methods of anchoring the cable 30 to the anchor block 16 include potting the ground shield 36 with a conductive adhesive once it is placed in the hole 40, insert molding the anchor block 16 with the cable 30 in place at the time of molding, and press fitting a rigidized, for example, pretinned, ground shield into the hole 40.

Once the cables 30 are anchored in the anchor block 16, the face 20 of the anchor block 16 and cable ends 136 are properly dressed to make a reliable electrical contact with small compliant contacts. The cable ends 136 and the anchor block face 20 may need to be polished and planarized by some mechanical means, such as by milling, grinding, or sanding, in order to make sure that the cable center conductor 32 is positioned at a known depth with respect to the anchor block face 20, in this case flush with the anchor block face 20. The cable ends 136 and face 20 may also require noble metal plating to prevent the polished surface from oxidizing or otherwise degrading so as to inhibit acceptable electrical connection to the center conductor 32 and the anchor block 16.

Figure 8:
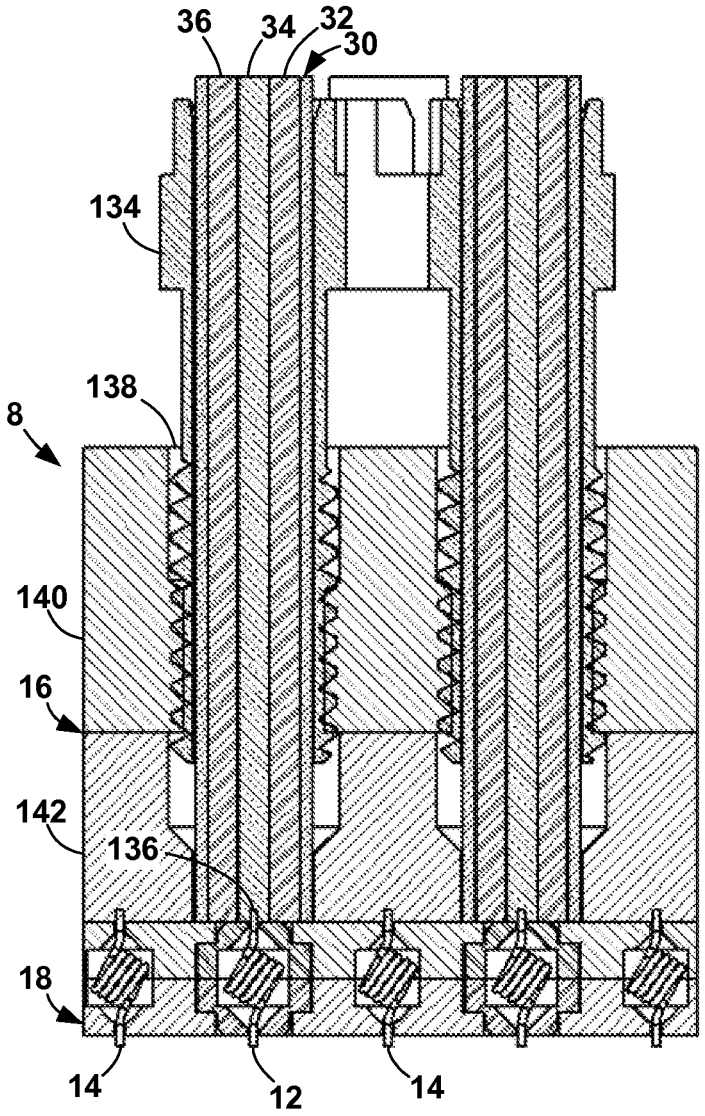
FIG. 8 is a cross-sectional view of a method of removably attaching the cable to the anchor block.
Figure 9:
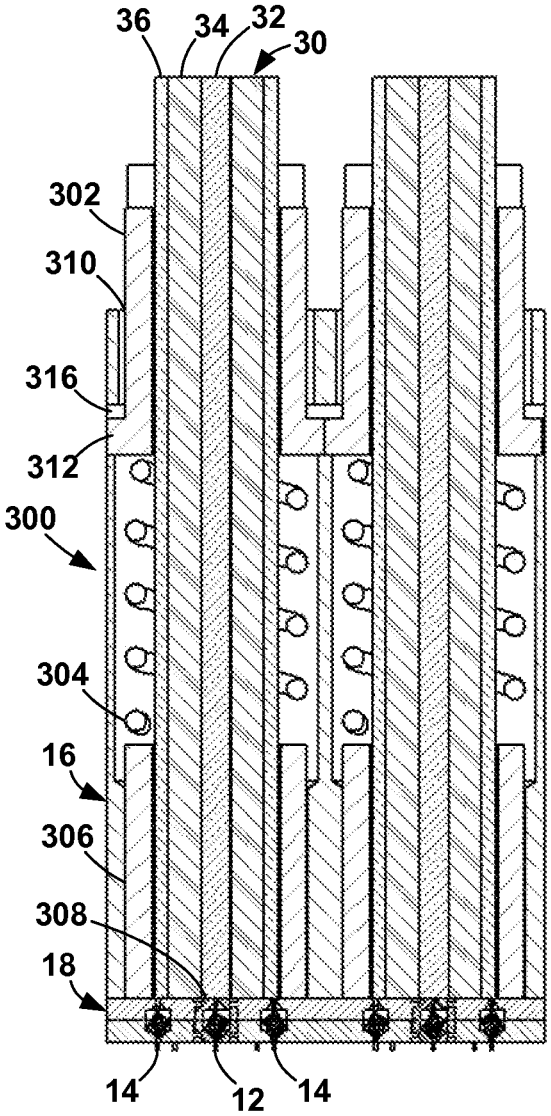
FIG. 9 is a cross-sectional view of another method of removably attaching the cable to the anchor block.

Methods of removably attaching the cable 30 to the anchor block 16 are shown in FIGS. 8 and 9. These methods permit replacement of individual cables 30 so the entire assembly does not have to be replaced. The first method calls for attaching a ferrule at or near the end of the cable 30 for dressing the cable end. The sheath 38 is stripped back and a threaded ferrule 134 is slipped over the shield 36. The ferrule 134 is attached to the cable by soldering, crimping, or other mechanical means that electrically couples the ferrule 134 to the shield 36. The cable end 136 is then dressed by polishing so as to achieve a flat surface on the cable end 136. The ferrule 134 is then threaded into a threaded hole 138 in the anchor block 16 until the center conductor 32 is pressed to the signal contact 12 in order to produce an electrical connection between the center conductor 32 and the signal contact 12.

In the configuration of FIG. 8, the anchor block 16 has two parts 140, 142. The top part 140 has the threaded hole 138 into which the ferrule 13 is threaded. The bottom part 142 is for precisely aligning the cable end 136 so that the center conductor 32 is directly over the signal contact 12.

This method can be use for precisely terminating individual cable on very tight pitch as in 1 mm or less spacing between cable center conductors 32.

The second method of removably attaching the cable 30 to the anchor block 16 calls for the use of a twist-lock attachment 300, as shown in FIG. 9. A twist-lock component 302 is slipped over the cable 30 such that the component 302 can slide freely over the cable 30. A coil spring 304 is slipped over the cable 30. After the sheath 38 is stripped back, a ferrule 306 is attached to the shield 36 by soldering, crimping, or other mechanical means that electrically couples the ferrule 306 to the shield 36. The cable end 308 is then dressed by polishing so as to achieve a flat surface on the cable end 308.

The cable end 308 is inserted into a hole 310 in the anchor block 16. Protrusions 312 from the twist-lock component 302 slide down opposed notches, not shown, in the sides of the hole 310 until they align with an annular depression 316 in the hole 310. With this alignment, the spring 304 is compressed so that it presses the center conductor 32 to the signal contact 12 in order to produce an electrical connection between the center conductor 32 and the signal contact 12. The twist-lock component 302 is turned so that the protrusions 312 are captured by the annular depression 316, thereby retaining the cable 30 in the hole 310.

Figure 10:
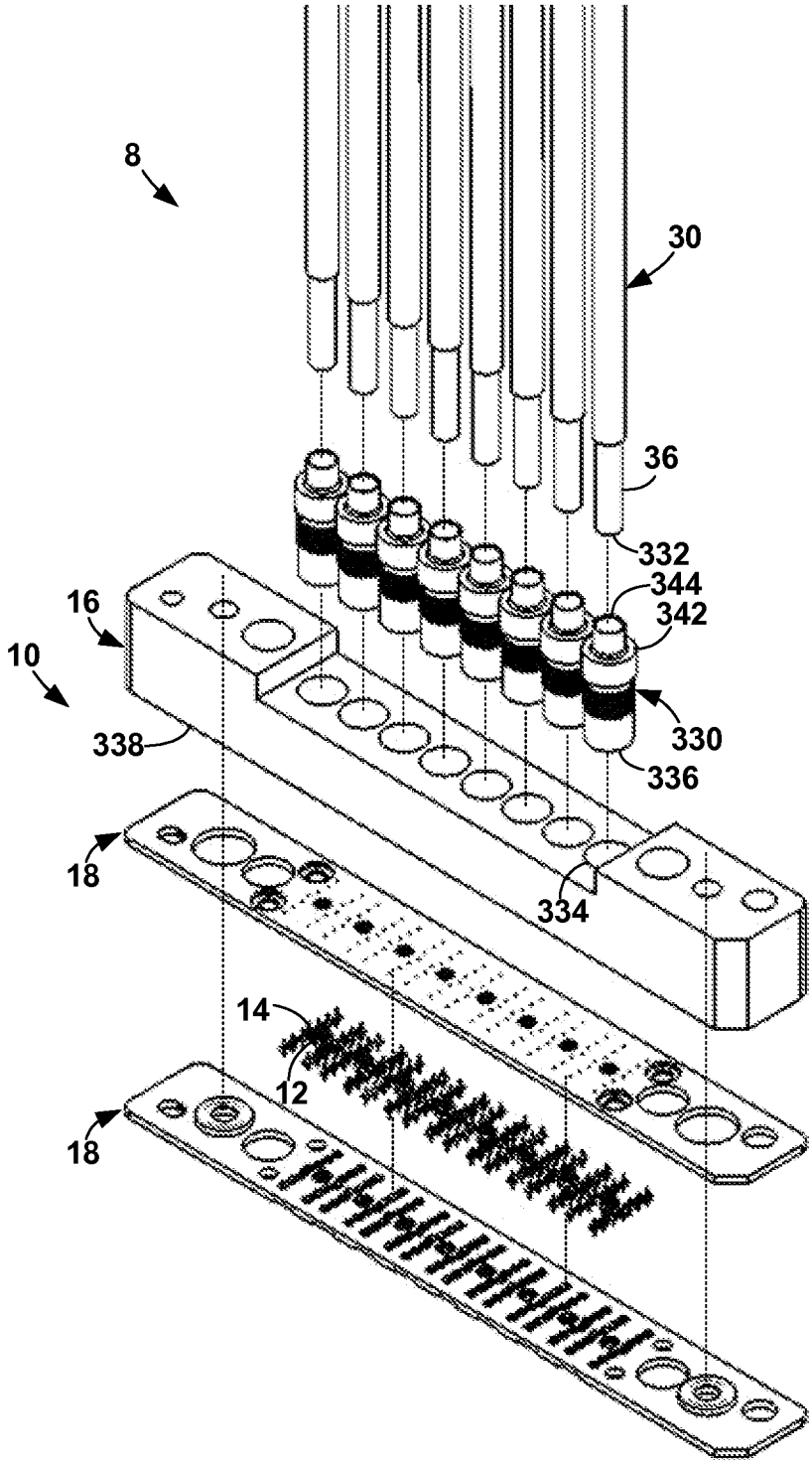
FIG. 10 is an exploded view of the cable termination assembly of FIG. 1 with a nonconductive anchor block.
Figure 11:
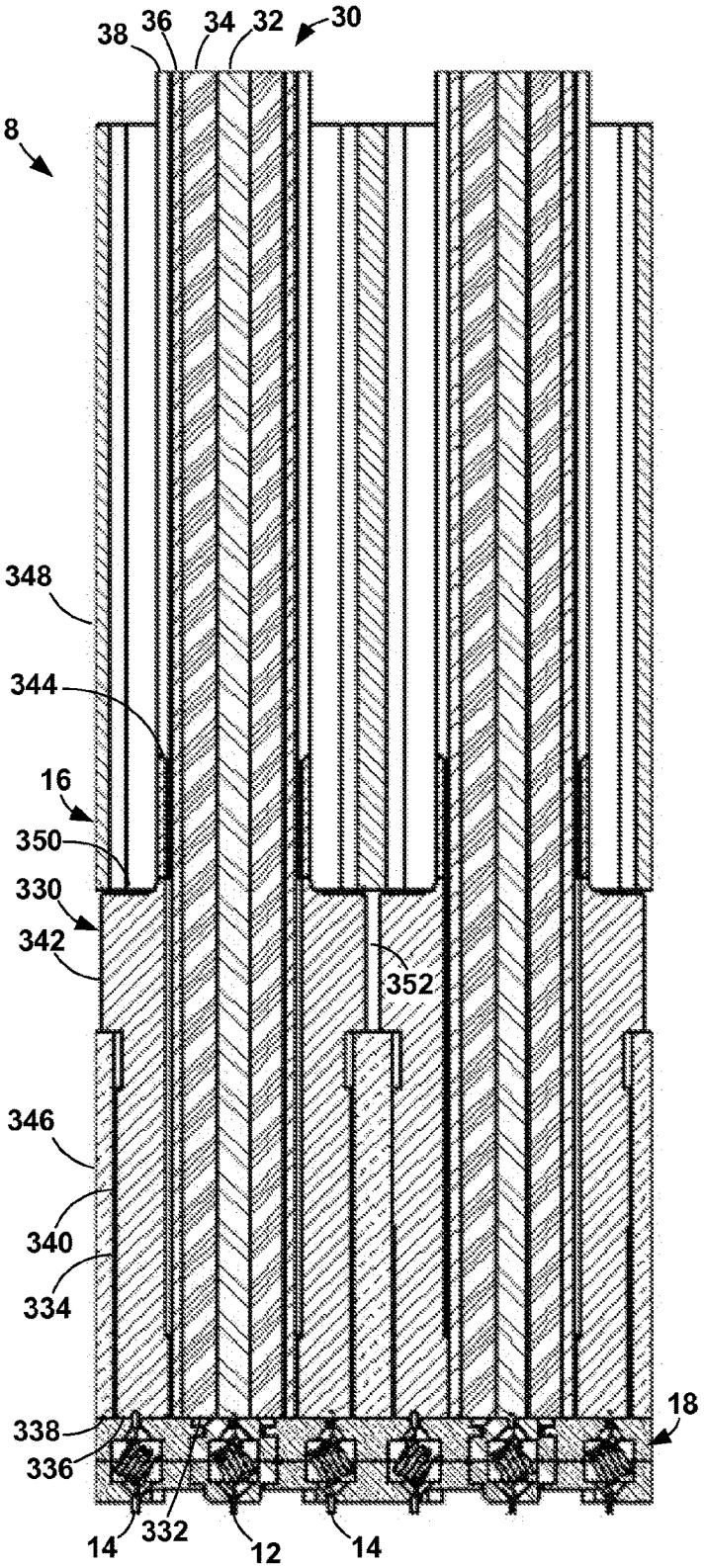
FIG. 11 is a front cross-sectional view of the cable termination assembly of FIG. 4 with a nonconductive anchor block taken along the line B-B.

In another embodiment, the anchor block 16 is nonconductive and merely provides an anchor for the cables 30, as in FIGS. 10 and 11. The anchor block 16 is composed of a nonconductive material. The cable sheath 38 is stripped back and an electrically-conductive ferrule 330 is slipped over the shield 36. The ferrule 330 is attached to the cable by soldering, crimping, or other mechanical means that electrically couples the ferrule 330 to the shield 36.

The cable end 332 is then dressed by polishing so as to achieve a flat surface on the cable end 332. The ferrule 330 is then inserted into a hole 334 in the anchor block 16 until the center conductor 32 is pressed to the signal contact 12 and the ferrule 330 is pressed against the ground contacts 14.

The present invention contemplates a number of different ways for the ferrule/cable assembly to be retained in the anchor block 16. Two such methods are described above with reference to removable cables and FIGS. 8 and 9. The first uses a threaded attachment and the second uses a twist-lock attachment.

Another method is via a press fit. Optionally, the side 340 of the ferrule 330 is knurled or otherwise roughened. The ferrule/cable assembly is forced into the hole 334, which is slightly smaller, until the cable end 332 is flush with the block face 338.

Another method is shown in FIG. 11. The ferrule 330 has an annular ridge 342 either at the end 344 of the ferrule 330 or away from the end 344, as in FIG. 11. The anchor block 16 has two sections, a bottom section 346 and a top section 348. The upper end of the hole 334 in the bottom section 346 has an annular groove 352. When the ferrule/cable assembly is inserted into the hole 334, the ridge 342 fits into the groove 352 with the cable end 332 flush with the block face 338. The block top section 348 is installed on the bottom section 346 and attached via screws, clips, or any other acceptable method. The top section 348 captures the ferrule/cable assembly in the anchor block 16. Optionally, the ridge 342 and groove 352 can be keyed to prevent the ferrule/cable assembly from rotating in the hole 334.

In some designs, particularly with removable attachments, the cable end may not be exactly flush with the anchor block face 20, that is, it may be slightly recessed into or protruding from the anchor block face 20. That recession or protrusion can be as much as 0.05 inch. The present specification and claims use the term, "flush", to indicate that the cable end is actually flush with, slightly recessed into, or slightly protruding from the anchor block face 20 by as much as 0.05 inch.

Figure 13:
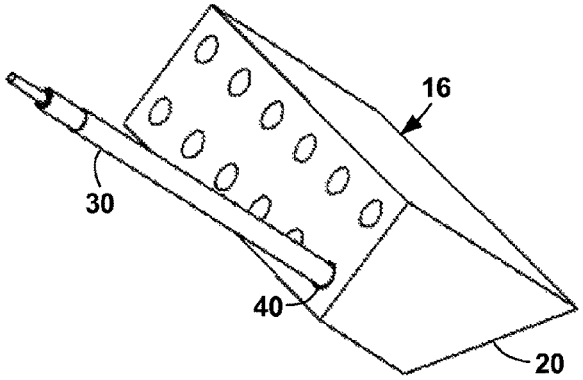
FIG. 13 is an isometric view of an angled anchor block.
Figure 14:
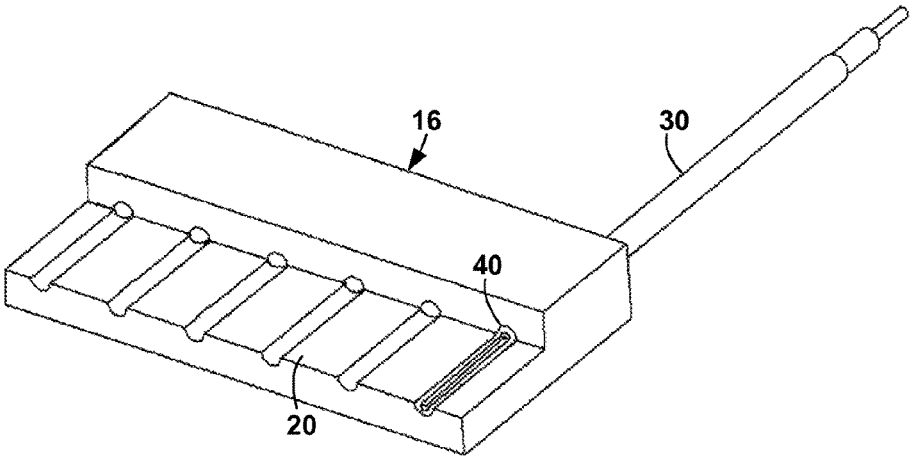
FIG. 14 is an isometric view of a parallel anchor block.

In most of the present figures, the anchor block 16 is generally a rectangular solid where the cables 30 are perpendicular to the anchor block face 20. However, the anchor block 16 can have other shapes. FIG. 13 shows an angled anchor block 16 where the cables 30 are at an angle to the anchor block face 20. FIG. 14 shows a parallel anchor block 16 that can be used with a device edge attachment.

Figure 15:
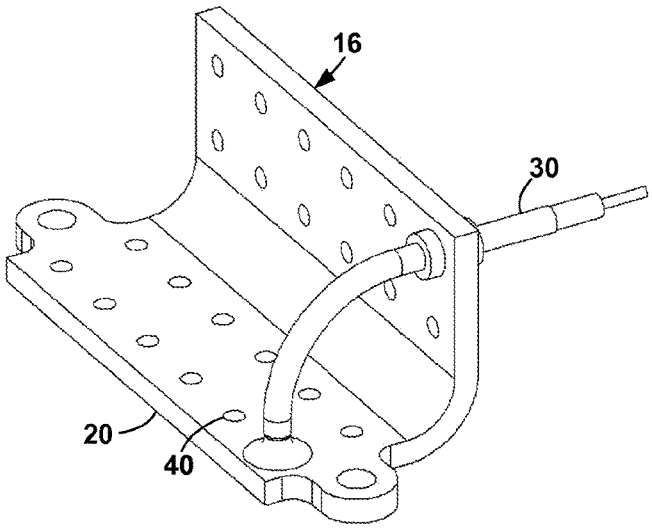
FIG. 15 is an isometric view of a right-angle anchor block.
Figure 16:
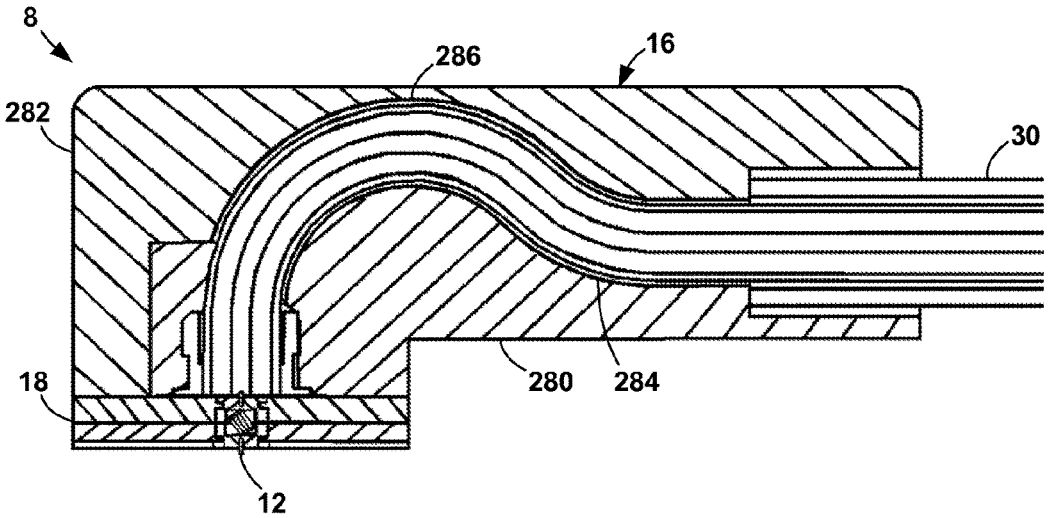
FIG. 16 is a cross-sectional side view of a configuration of a right-angle anchor block.

FIG. 15 shows a generic right angle anchor block 16 where the cables 30 bends through 90°. FIG. 16 shows a right angle anchor block 16 with a strain relief. The anchor block 16 has a base 280 that is composed of a conductive or non-conductive, generally rigid material. The cable 30 rests in a channel 284 in the base 280. A cover 282 that is composed of a conductive or non-conductive, relatively rigid material is attached to the base 280. The manner of attachment depends on the base and cover materials. For example, if the base 280 and cover 282 are both metallic, the attachment can be by screws. If the base 280 and cover 282 are both plastic, the attachment can be the cover 282 snapping onto the base 280 with tabs and slots. The channel 284 has a bend 286 that provides strain relief when the base 280 and cover 282 are assembled.

These are only examples of other anchor block shapes. The present invention contemplates that the anchor block 16 can have any shape that works for a particular application.

Example compliant contacts for use with the present invention include spring probes, electrically-conductive rubber contacts, fuzz button contacts, stamped metal contacts, chemically etched contacts, and skewed coil contacts.

A typical spring probe consists of a hollow barrel with a spring and one or two plungers. The spring is housed in the barrel with the end of the plungers crimped in opposed open ends of the barrel at the ends of the spring. The spring biases the plungers outwardly, thereby providing a spring force to the tip of the plungers.

Conductive elastomer bumps are made of rubber and/or silicones of varying types with embedded conductive metal elements. The elastomer bump can work when the device conduction point is elevated off the device, thus sometimes requiring a protruding feature from the device or the addition of a third conductive element to the system to act as a protruding member.

Alternatively, the contact can be made of a single sheet of anisotropic conductive elastomer which is an elastomeric sheet that only conducts electricity through its thickness.

A fuzz button is a wire that is crumpled into a cylindrical shape. The resulting shape looks very much like tiny cylinder made of steel wool. When the cylinder is placed within a hole in a sheet of nonconductive material, it acts like a spring that is continuously electrically shorted. Like elastomer bumps, the fuzz button can be used with a third element needed to reach inside the hole of the nonconductive sheet to make contact with the fuzz button.

Skewed coil contacts of various types and configurations are described in U.S. Pat. Nos. 7,126,062 and Re41,663, both of which are incorporated herein by reference. Briefly, the skewed coil contact includes a coil of conductive, inherently elastic wire with a pair of oppositely extending leads. The leads extend in a direction angled from the coil axis. During compression, the coil loops are electrically shorted together while they slide along each other.

Figure 12:
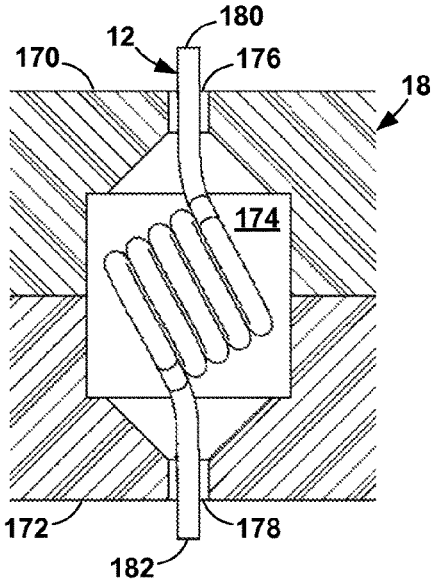
FIG. 12 is a cross-sectional view showing the common features of the plate.

The figures illustrate the use of skewed coil contacts, fuzz button contacts, conductive rubber contacts, and stamped metal or a chemically etched contacts. As indicated above, the plate 18 holds the contacts 12, 14. The structure of the plate 18 depends on the type of contact. Regardless of the type of contact, the plate 18 has several common features. These features are shown in FIG. 12 with reference to the skewed coil contact as a signal contact 12, but apply to all types of contacts as well as the ground contacts 14. The plate 18 has a face surface 170 that abuts the anchor block face 20 when the terminator 10 is assembled. The plate 18 has a device surface 172 that generally abuts the device 2 when the terminator 10 is connected to the device 2. The plate 18 has at least one through aperture 174 for the contacts 12, 14. The apertures are either signal apertures or ground apertures, depending on the type of signal that is carried in the contact in that aperture. Each aperture 174 has an anchor block face opening 176 and a device face opening 178. The signal apertures for the signal contacts 12 are aligned with the corresponding cable hole 40 in the anchor block 16. Prior to assembling the plate 18 to the anchor block 16, the anchor block contact point 180 of the contact 12 extends from the anchor block face opening 176. Prior to connecting the terminator 10 to the device 2, the device contact point 182 of the contact 12 extends from the device face opening 178.

Figure 17:
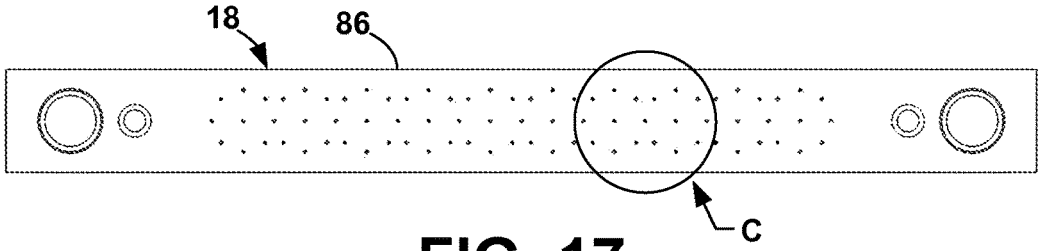
FIG. 17 is bottom view of the cable termination assembly of FIG. 1 with an insulating plate.
Figure 18:
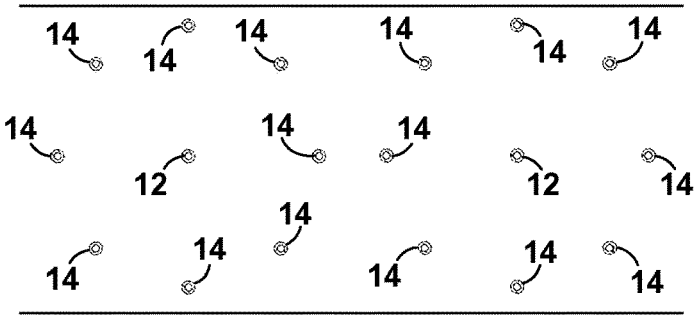
FIG. 18 is a detail view of a configuration of the bottom of the coax cable termination assembly of FIG. 17 taken at C.
Figure 19:
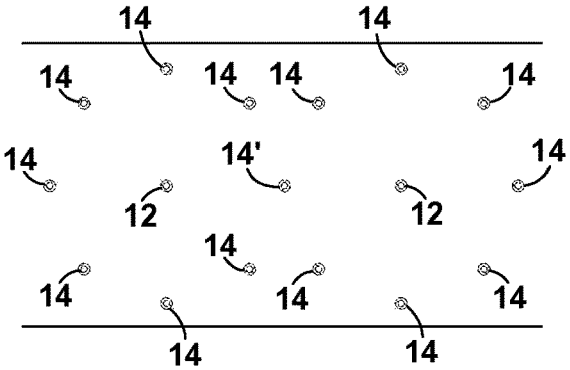
FIG. 19 is a detail view of another configuration of the bottom of the coax cable termination assembly of FIG. 17 taken at C.

FIGS. 17-41 show configurations of the present invention for a coaxial cable. The center conductor 32 of the cable 30 is connected to the signal conduction point 4 of the electrical device 2 by the compliant signal contact 12. As shown in FIGS. 17-19, the signal contacts 12 are surrounded by a number of ground contacts 14 that connect either the conducting anchor block 16 or the cable ferrule 330 to the device in a pattern that closely mimics the impedance environment of the cable 30, e.g. 50 ohms, 75 ohms, 85 ohms, or 100 ohms. The impedance of the system can be changed by changing the position of the ground contacts 14 with respect to the signal contact 12 or by changing the insulating material, thereby changing the dielectric constant of the material or both. Changing the locations of the ground contacts with respect to the signal contact is like changing the diameter of the ground shield on a coaxial cable from 2.5 mm for 50-ohm cable to 6 mm for 75-ohm cable. Alternatively, the dielectric may be changed so that the lower the dielectric constant of the material, the closer the ground shield can be to the cable signal conductor while the cable maintains the same impedance environment.

When there are two or more cables 30 and a conductive anchor block 16, there may be ground contacts 14 that are "shared" between cables 30. For example, in the coaxial structure of FIG. 19, the ground contact 14' between the two signal contacts 12 is common to both cables. The common ground contact can also been seen in FIG. 20, where the right side ground contact 14 is between the ground shields 36 of adjacent cables 30. Another example is shown in the twin-axial structure of FIG. 48, where the ground contacts 14' between the two signal contacts of adjacent cables 30 are common to both cables.

Figure 20:
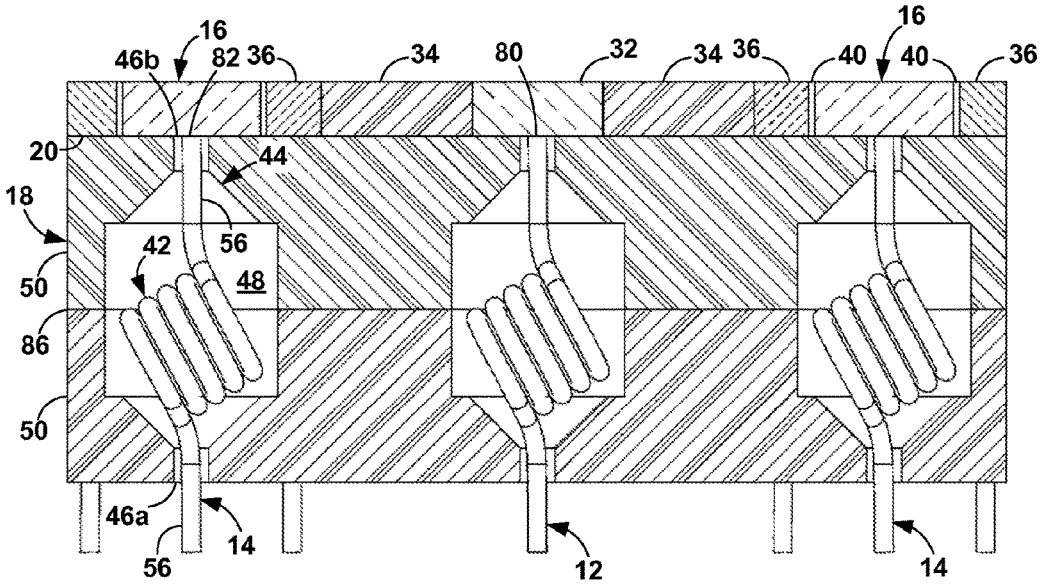
FIG. 20 is a detailed view of FIG. 7 taken at D showing the coax cable termination using a skewed coil contact with a conductive anchor block and an insulating plate having mirror-image sheets.
Figure 21:
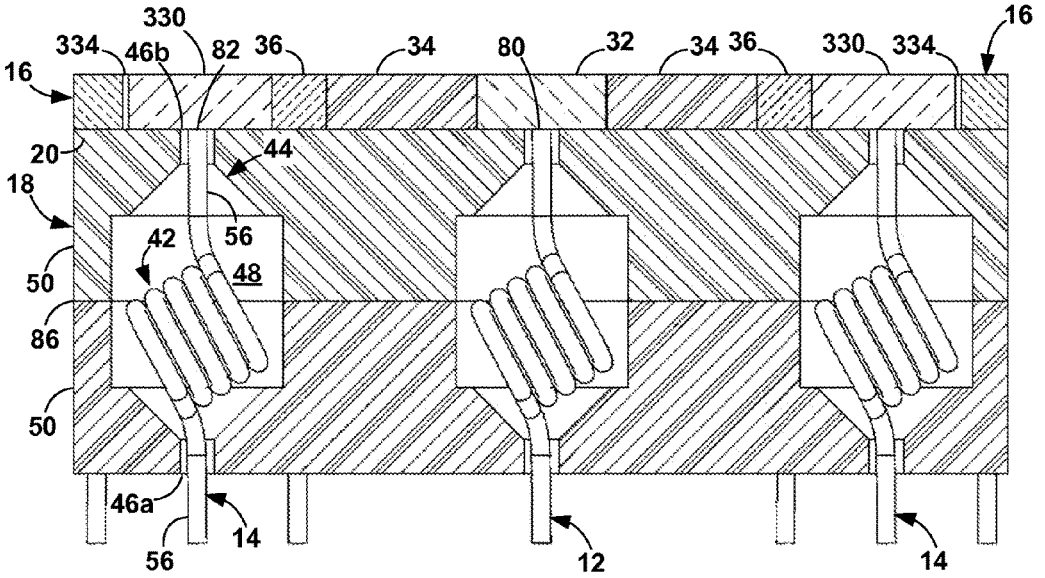
FIG. 21 is a detailed view of FIG. 7 taken at D showing the coax cable termination using a skewed coil contact with a nonconductive anchor block and an insulating plate having mirror-image sheets.
Figure 22:
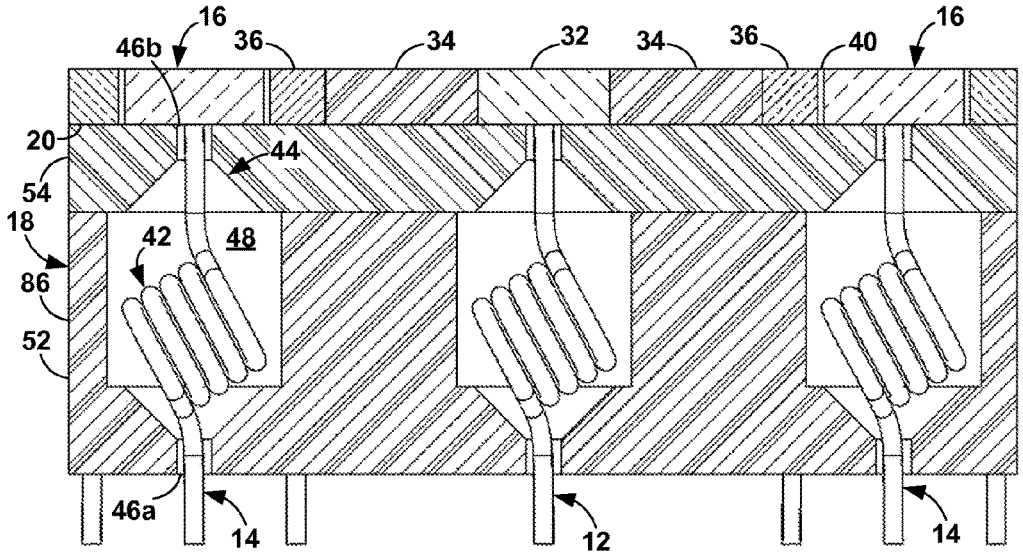
FIG. 22 is a detailed view of FIG. 7 taken at D showing the coax cable termination using a skewed coil contact with an insulating plate having asymmetrical sheets.

As shown in FIGS. 20-22, the skewed coil contact 42 is captured in a through aperture 44 in the plate 18. The aperture 44 has a larger center section 48 that narrows to a smaller block opening 46b at the side adjacent to the anchor block 16 and to a smaller device opening 46a at the other end. In one configuration, shown in FIGS. 20 and 21, the plate 18 has two mirror image sheets 50 where each sheet 50 has one opening 46a, 46b and a half of the center section 48. The contact 42 is placed in the center section 48 of one sheet 50 and the sheets 50 are sandwiched together to capture the contact 42. In another configuration, shown in FIG. 22, the plate 18 has a base sheet 52 with one of the openings 46a and the center section 48 and a top sheet 54 with the other opening 46b. The contact 42 is placed in the center section 48 and the sheets 52, 54 are sandwiched together, capturing the contact 42 within the aperture 44. The length of the contact leads 56 is such that the leads 56 extend from the openings 46a, 46b.

Figure 23:
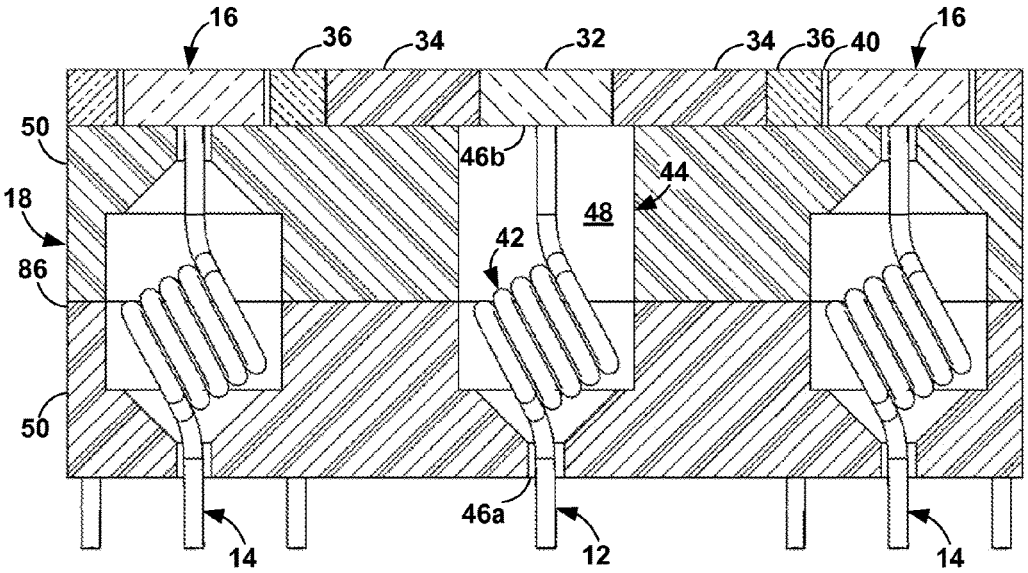
FIG. 23 is a detailed view of FIG. 7 taken at D showing the coax cable termination using a skewed coil contact with an insulating plate having an elongated center section.

An alternative configuration is shown in FIG. 23. Rather than a wider center section with smaller openings at both ends, the center section 48 extends its full width from the block opening 46b to a smaller device opening 46a on the opposite side of the plate 18 from the anchor block 16. When the plate 18 is mounted to the anchor block 16, as described below, the contact 12, 14 is secured in the plate 18. If all of the apertures 44 are of this design, the plate 18 does not have to have two sheets 50. Since the contacts 12, 14 can be installed from the block opening 46b, the plate 18 can be a single sheet.

Because of the very small size of the wire used to make the skewed coil contact 42, the contact area between the skewed coil signal contact 12 and the cable center conductor 32 is small. This can cause a capacitive reactance at the interface of the contact leg 56 and the cable center conductor 32 which can cause reflections at high frequencies. To help alleviate this problem, the through aperture 44 is wide for its entire length, as in FIG. 24. Each end has an annular shoulder 60. A pair of conductive bosses 62 with a shoulder 64 fit into the aperture 44, with the shoulders 60, 64 retaining the bosses 62 in the aperture 44. The boss 62 has a through hole 66 that narrows from the center of the aperture 44 to a smaller device opening 46a and a smaller block opening 46a at the ends through which the contact leads 56 extend. The bosses 62 increase the effective area of the contact lead 56.

Figure 24:
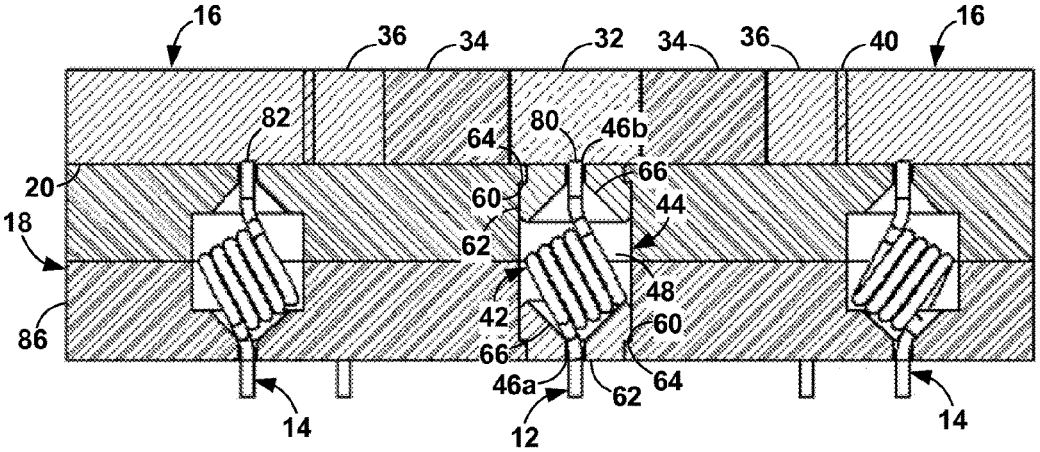
FIG. 24 is a detailed view of FIG. 7 taken at D showing the coax cable termination using a skewed coil contact with an insulating plate and conductive bosses.

In FIG. 24, the conductive bosses 62 are shown spaced from each other, that is, they do not touch each other. In an alternative configuration, the conductive bosses 62 are made long enough to touch each other, either around the entire circumference of the aperture 44 or only portions of the circumference, such as with extending fingers. This can alleviate the potential problem of the conductive bosses 62 acting as a capacitive device if the contact 12 does not short them together.

Optionally, in any skewed coil contact configuration, after the contact 42 is installed, the remaining space of the aperture 44 is filled with a compliant, electrically conductive elastomer that adds resiliency and aids in electrically shorting the coil loops.

Figure 25:
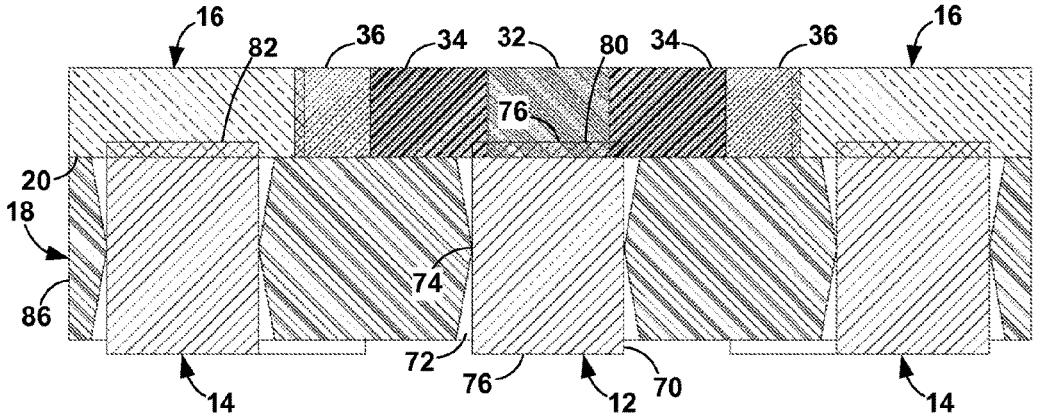
FIG. 25 is a detailed view of FIG. 7 taken at D showing the coax cable termination using a fuzz button contact with an insulating plate.

As shown in FIG. 25, the fuzz button contact 70 is cylindrical. The plate 18 has a through aperture 72 that is narrower at the center than the ends, as at 74. The contact 70 is forced into the aperture 72. The length of the contact 70 is such that the ends 76 extend from the plate 18.

Figure 26:
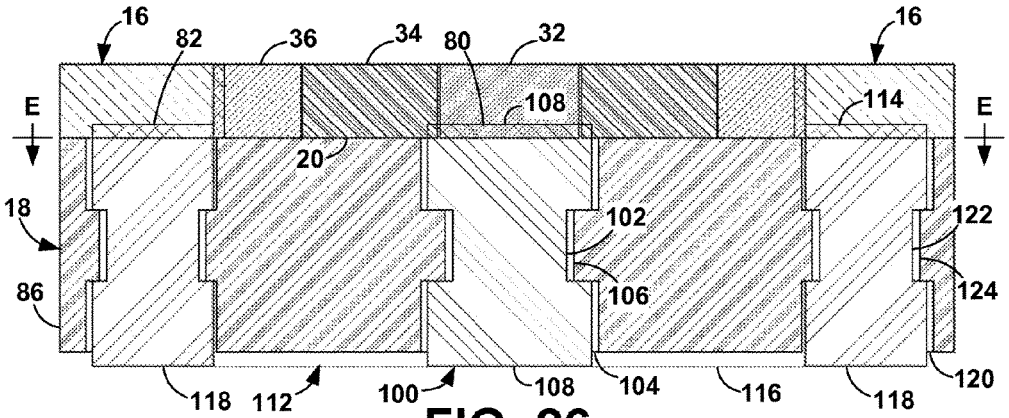
FIG. 26 is a detailed view of FIG. 7 taken at D showing the coax cable termination using a conductive rubber contacts with an insulating plate.
Figure 27:
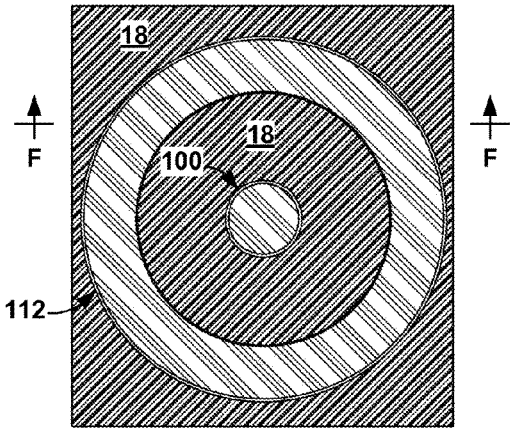
FIG. 27 is a cross-sectional view of FIG. 26 taken at E-E.
Figure 28:
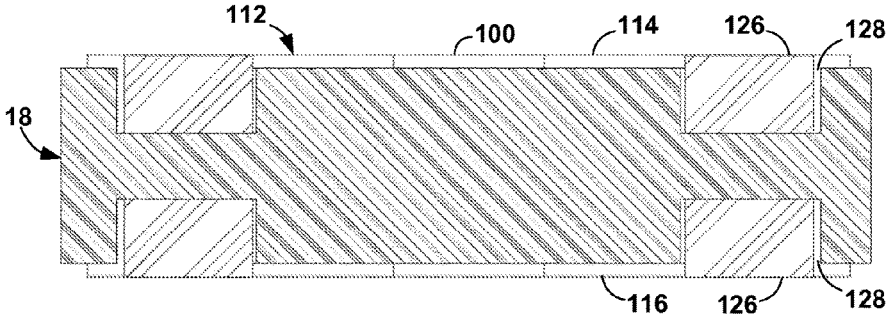
FIG. 28 is a cross-sectional view of FIG. 27 taken at F-F.
Figure 29:
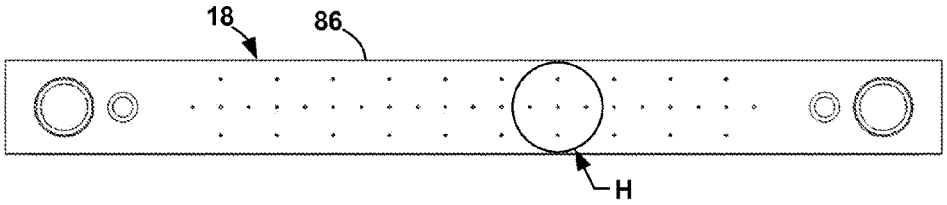
FIG. 29 is bottom view of the cable termination assembly of FIG. 1 using stamped or etched contacts embedded in an insulating plate.
Figure 30:
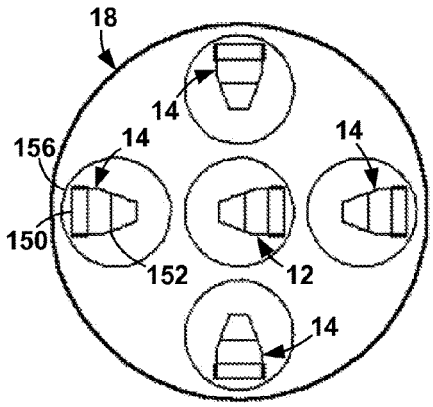
FIG. 30 is a detail view of the bottom of the coax cable termination assembly of FIG. 29 taken at H.
Figure 31:
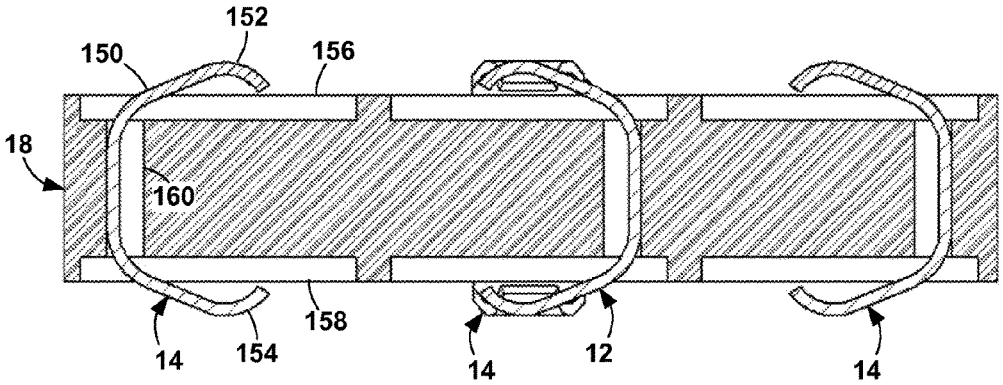
FIG. 31 is a cross-sectional view of the plate of FIG. 29 before installation on the anchor block.
Figure 32:
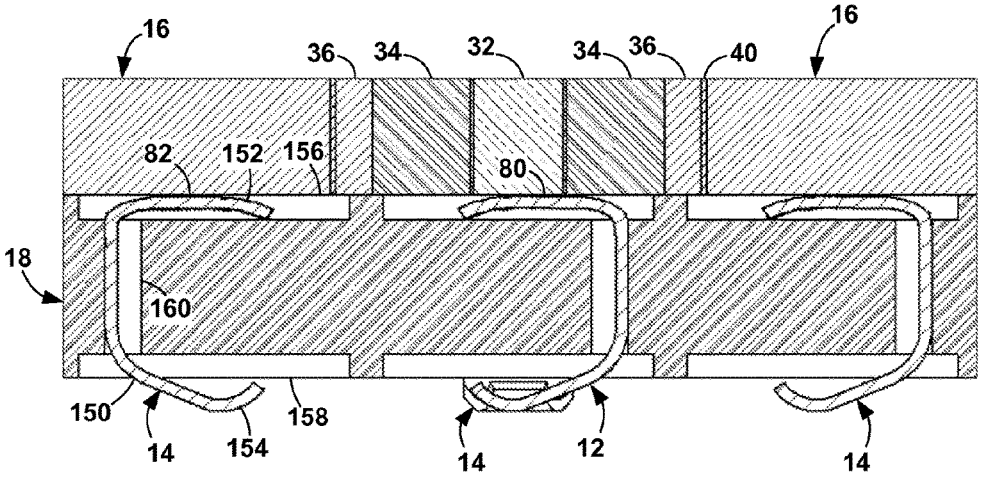
FIG. 32 is a detailed view of FIG. 7 taken at D showing the coax cable termination using stamped or etched contacts embedded in an insulating plate.

As shown in FIGS. 26-28, the conductive rubber contact 100 for the signal contact 12 can be cylindrical with a centrally-located annular depression 102. The plate 18 has a through aperture 104 with a centrally-located annular protrusion 106. The rubber contact 100 is radially compressed and placed in the aperture 104 such that the protrusion 106 fits into the depression 102 to retain the contact 100 in the aperture. The length of the contact 100 is such that the ends 108 extend from the plate 18.

The conductive rubber contact for the ground contact 14 can be of the same structure as the signal contact 12. Alternatively, the conductive rubber contact 112 for the ground contact 14 is circular, surrounding the signal contact 12, as in FIG. 27. The conductive rubber contact 112 has a circular top sheet 114 adjacent to the anchor block 16 and a circular bottom sheet 116 for interfacing to the device 2. The two sheets 114, 116 are electrically connected by a plurality of plugs 118 in through apertures 120 in the plate 18. The number of plugs 118 can vary by application and is typically four or eight spaced evenly around the signal contact 100. As with the signal contact 100, each plug 118 has an annular depression 122 that fits into an annular protrusion 124 for retention. Optionally, knobs 126 extending from the sheets 114, 116 into depressions 128 in the plate 18, as in FIG. 28, help retain the sheets 114, 116 in position.

In FIGS. 29-32, the contact 150 is a strip of conductive material in a C shape. The contact 150 can be formed by chemical etching, by stamping and forming, or by any other means practical. The contact 150 is captured in a through aperture 160 in the plate 18. In their quiescent state, the contact leads 152 extend outwardly of the plate 18, as in FIG. 31. When the anchor block 16 is attached to the plate 18, the upper lead 152 deforms toward the plate 18 and into a depression 156, as in FIG. 32, thereby providing electrical contact by the signal contact 12 to the center conductor 32 and by the ground contacts 14 to the anchor block 16. When the assembly is connected to the device 2, the lower lead 154 deforms toward the plate 18 and into a depression 158.

Figure 33:
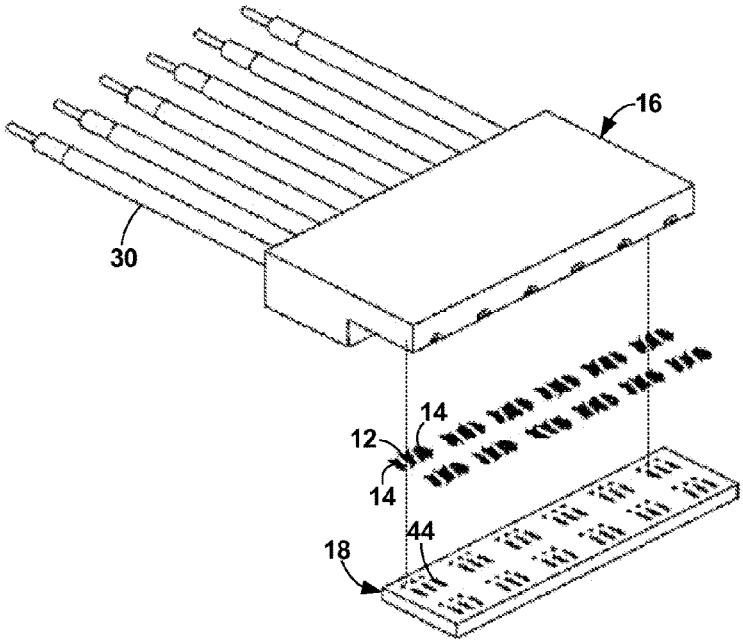
FIG. 33 is an exploded view of the cable termination assembly using the anchor block of FIG. 14 with an insulating plate.
Figure 34:
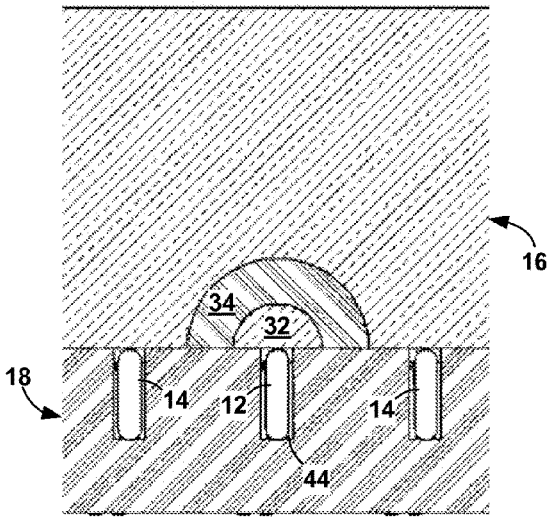
FIG. 34 is a cross-sectional view of the cable termination assembly using the anchor block of FIG. 14 with an insulating plate.

An alternate terminator assembly 10 using the anchor block of FIG. 14 is shown in FIGS. 33 and 34. The compliant contacts 12, 14 fit into apertures 44 in the plate 18. The signal contact 12 presses against the center conductor 32 that has been bisected longitudinally and dressed.

The electrical connection 80 between the center conductor 32 and the signal contact 12 and the electrical connection 82 between the anchor block 16 and the ground contacts 14 are compression connections. With the contacts 12, 14 installed in the plate 18, the plate 18 is mounted to the anchor block 16 with mechanical attachments 28, such as screws, rivets, and the like. Installing the plate 18 forces the end of the signal contact 12 against the end of the center conductor 32 and forces the ends of the ground contacts 14 against the anchor block 16.

Alternatively, the electrical connection 80 between the center conductor 32 and the signal contact 12 is a solder connection while the electrical connection 82 between the anchor block 16 and the ground contacts 14 is a compression connection.

Figure 35:
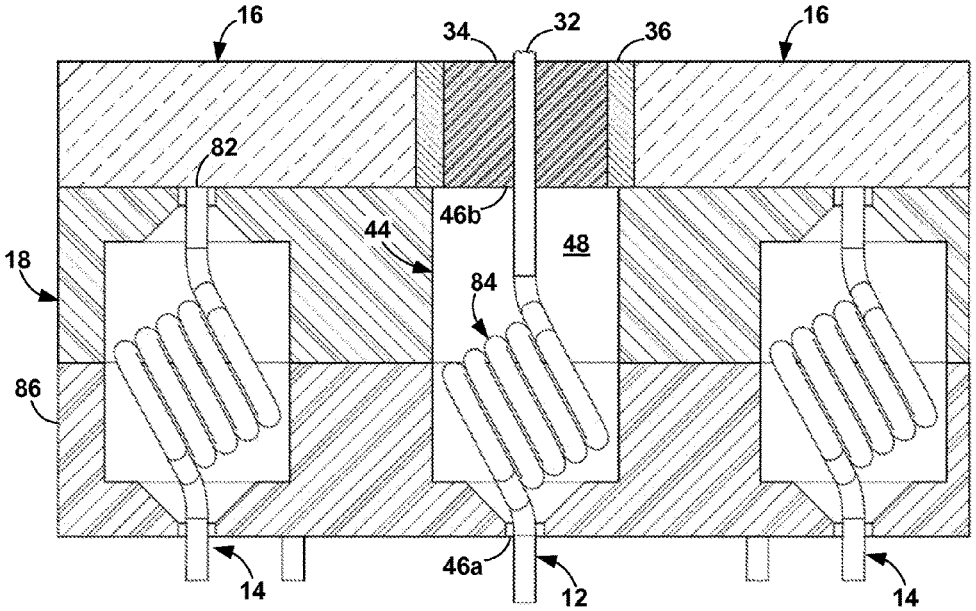
FIG. 35 is a detailed view of FIG. 7 taken at D showing the coax cable termination using a skewed coil contact for the ground contacts and a shaped cable center conductor for the signal contact with an insulating plate.
Figure 36:
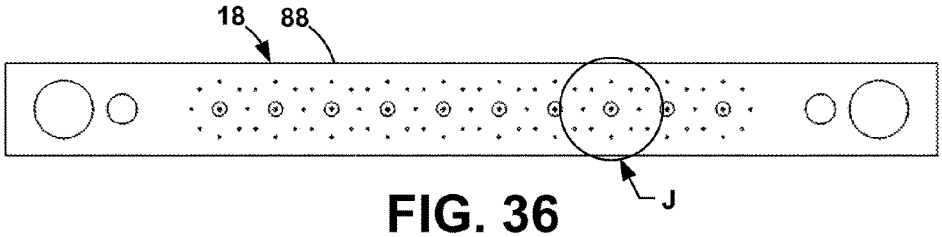
FIG. 36 is bottom view of the cable termination assembly of FIG. 1 with coaxial cables, a conductive plate, and insulating plug for the signal contact.
Figure 37:
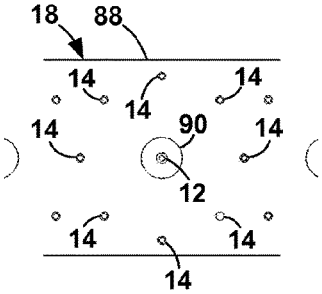
FIG. 37 is a detail view of the bottom of the coax cable termination assembly of FIG. 36 taken at J with a conductive plate and insulating plug for the signal contact.

Alternatively, as shown in FIG. 35, the end of the center conductor 32 is formed into a compliant spring like the skewed coil contact, as at 84. The plate 18 is configured like that of FIG. 23, where the block opening 46b is the same size as the center section 48. The plate 18 is assembled without a signal contact 12 and, when the plate 18 is installed, the end of the center conductor 32 extends through the device opening 46a. The electrical connection 82 between the anchor block 16 and the ground contacts 14 is a compression connection.

The plate 18 can be either insulating or conductive. FIGS. 20-35 show an insulating plate 86. The insulating plate 86 is made of a non-electrically-conductive material, preferably a plastic, so as to not electrically couple the signal contacts 12 and ground contacts 14.

A conductive plate 88, shown in FIGS. 36-41, is preferably composed of an electrically-conductive metal. Alternatively, the conductive plate is composed of a non-conductive material plated with a conductive coating. The conductive plate 88 electrically couples the ground contacts 14, thus providing more precise impedance matching to the signal contact 12. The signal contact 12 is insulated from the conductive plate 88 by an insulating centering plug 90 which prevents the signal contact 12 from electrically shorting to the conductive plate 88. The plug 90 includes the through aperture 44, the device opening 46a, the anchor block opening 46b, and the center section 48. The plug 90 is typically made from an insulating plastic.

Figure 38:
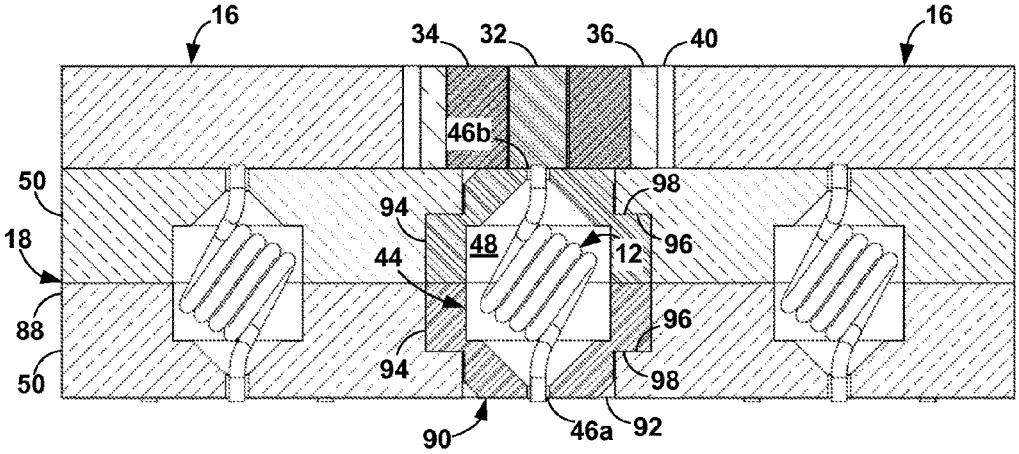
FIG. 38 is a detailed view of FIG. 7 taken at D showing the coax cable termination using a skewed coil contact with a conductive plate and insulating plug for the signal contact.

The plug 90 may be press fit into a through hole 92 in the conductive plate 88 or it may be bonded into the hole 92 with an adhesive. Alternatively, as shown in FIG. 38, the plug 90 is has two parts 94, each of which fit into one plate sheet 50. Mating shoulders 96, 98 retain the plug parts 94 in the plate sheets 50.

Figure 39:
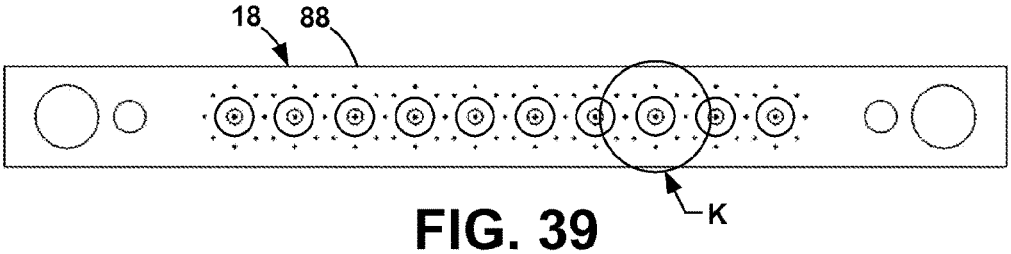
FIG. 39 is bottom view of the cable termination assembly of FIG. 1 with coaxial cables, a conductive plate, dielectric annulus, and conductive boss for the signal contact.
Figure 40:
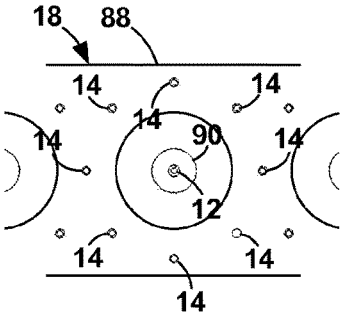
FIG. 40 is a detail view of the bottom of the coax cable termination assembly of FIG. 39 taken at K with a conductive plate, dielectric annulus, and conductive boss for the signal contact.
Figure 41:
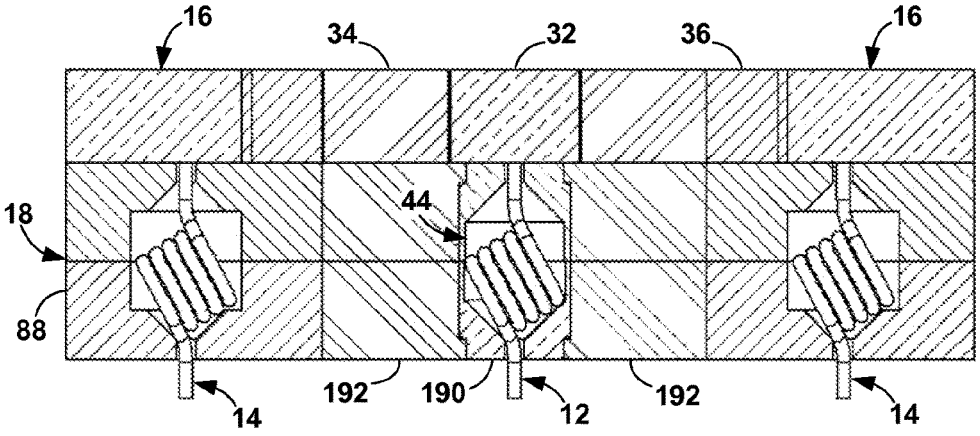
FIG. 41 is a detailed view of FIG. 7 taken at D showing the coax cable termination using a skewed coil contact with a conductive plate, dielectric annulus, and conductive boss for the signal contact.
Figure 42:
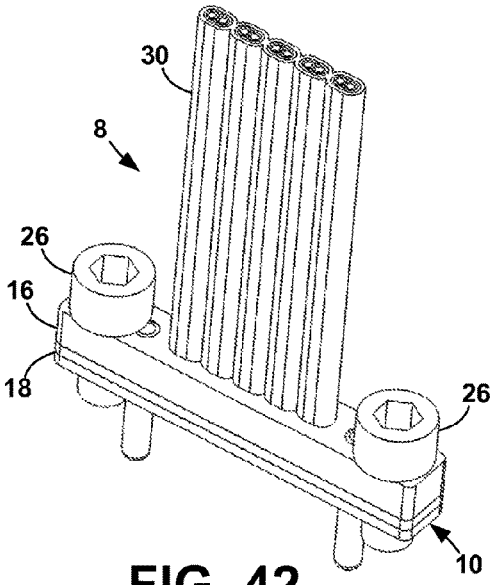
FIG. 42 is an isometric view of the cable termination assembly of the present invention for use with twin-axial cables.
Figure 43:
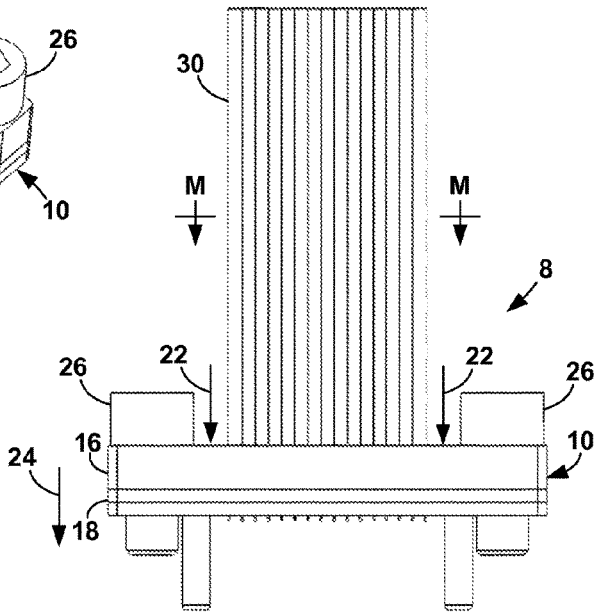
FIG. 43 is a front view of the cable termination assembly of FIG. 42.
Figure 44:
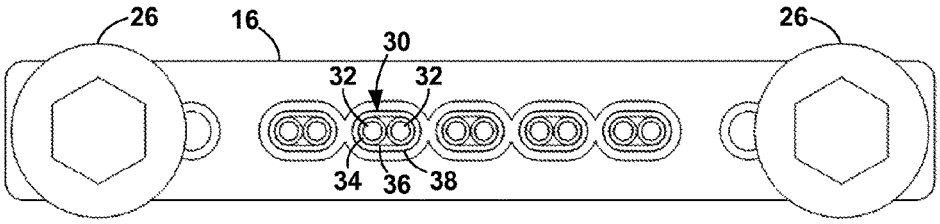
FIG. 44 is a top cross-sectional view of the cable termination assembly of FIG. 43 taken along the line M-M.
Figure 45:
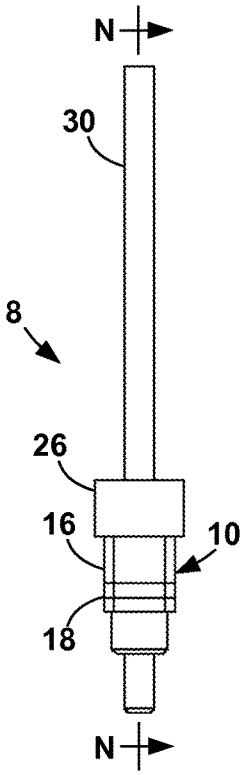
FIG. 45 is a side view of the cable termination assembly of FIG. 42.
Figure 46:
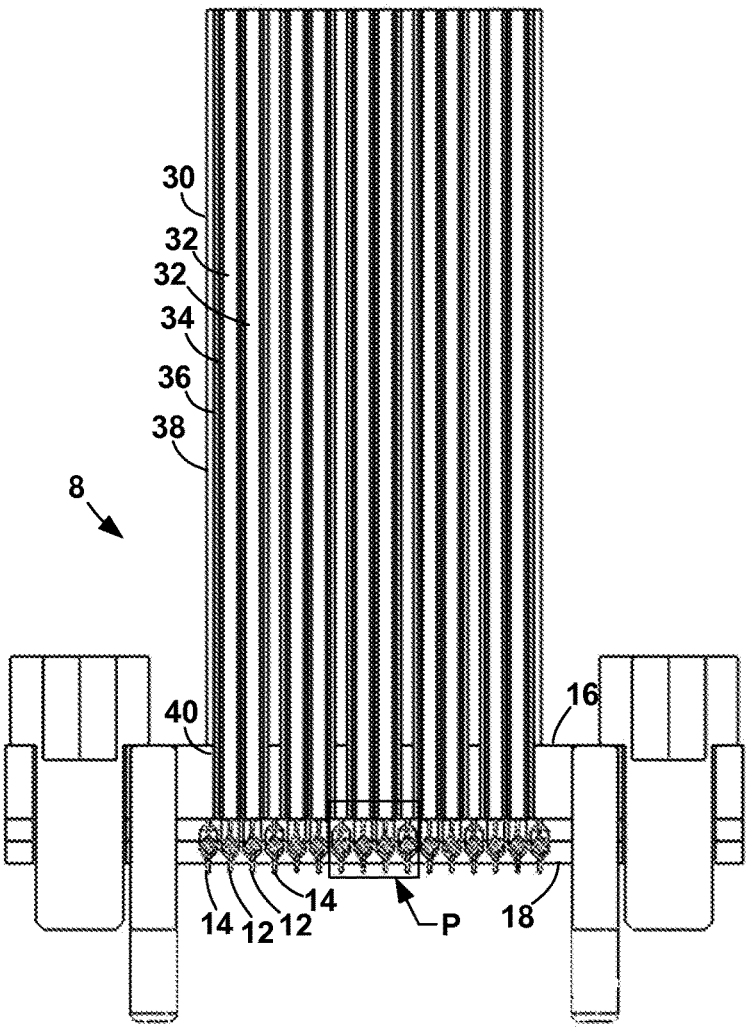
FIG. 46 is a front cross-sectional view of the cable termination assembly of FIG. 45 taken along the line N-N.

FIGS. 39-41 show a configuration where the signal contact aperture 44 is within a conductive boss 190, like that of FIG. 24. The boss 190 is surrounded by an insulating annulus 192 that insulates the conductive boss 190 from the conductive plate 88. The annulus 192 can be composed of any dielectric material, but a better match can be had if the annulus 192 is composed of the same material as the cable dielectric 34.

Alternatively, the signal contact 12 can be insulated from the conductive plate 88 by a non-conductive coating such as powder coating. In this case the signal contact aperture may be made larger such that the coating reduces the aperture size to the appropriate size for use. As with the plug 90, the impedance of the system can be changed by either changing the thickness of the coating or by changing the coating material, thereby changing the dielectric constant of the material.

FIGS. 42-55 show configurations of the present invention for a twin-axial cable. The twin-axial configurations are illustrated using the skewed coil contacts. The present invention contemplates that any of the various available compliant contacts, including those described with reference to the coaxial cable assembly, can be used with twin-axial cables, as well as cables with more than two center conductors.

The center conductors 32 of the cable 30 are connected to the signal conduction points 4 of the electrical device 2 by the compliant signal contacts 12. As shown in FIGS. 47-52, the signal contacts 12 are surrounded by a number of ground contacts 14 in a pattern that closely mimics the impedance environment of the cable 30, e.g. 50 ohms, 75 ohms, 85 ohms, or 100 ohms. As described above with reference to the coaxial cable assembly, the impedance of the system can be changed by changing the position of the ground contacts 14 with respect to the signal contact 12 or by changing the insulating material, thereby changing the dielectric constant of the material or both.

Figure 47:
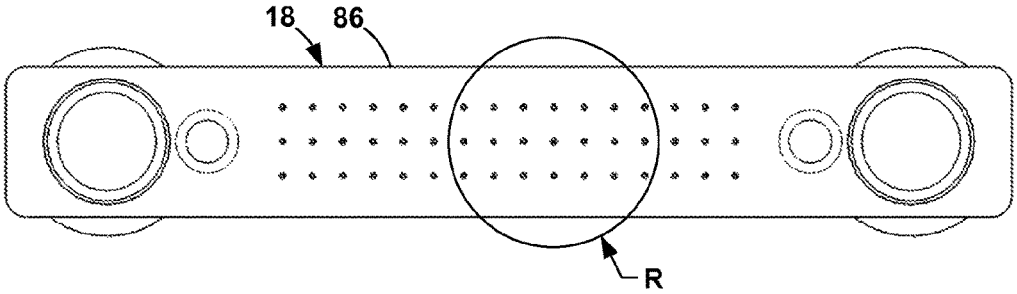
FIG. 47 is bottom view of the cable termination assembly of FIG. 42 with an insulating plate.
Figure 48:
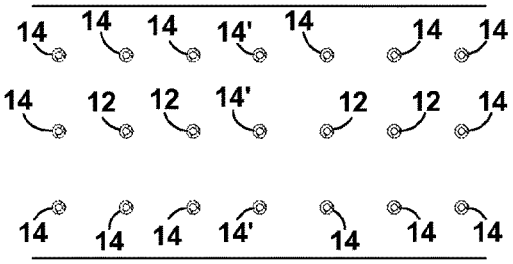
FIG. 48 is a detail view of the bottom of the cable termination assembly of FIG. 47 taken at R with an insulating plate.
Figure 49:
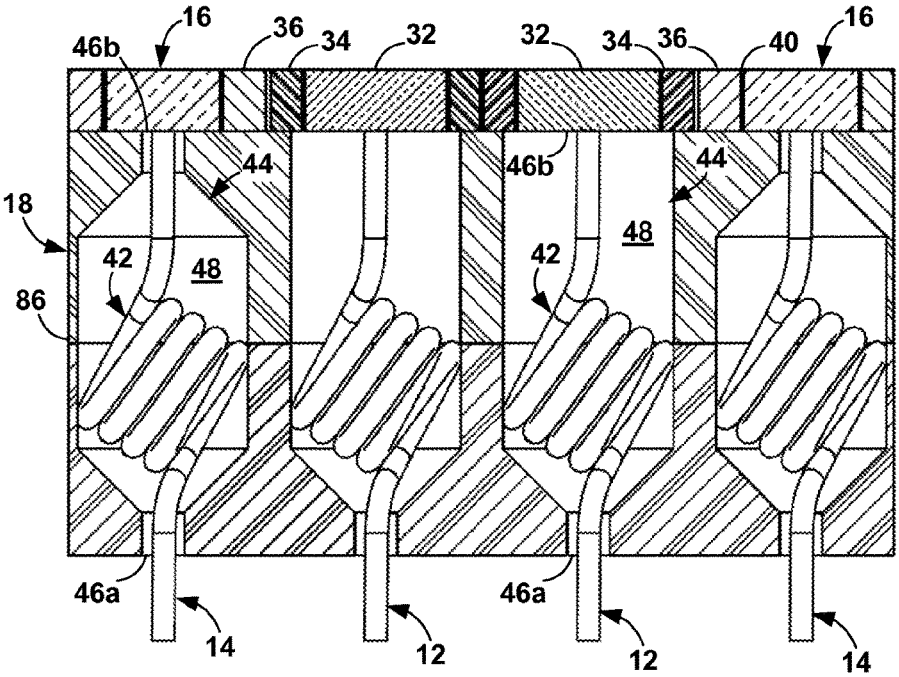
FIG. 49 is a detailed view of FIG. 46 taken at P showing the twin-axial cable termination using skewed coil contacts with an insulating plate.

As with the coaxial cable configurations, the plate 18 can be either insulating or conductive. FIGS. 47-49 show an insulating plate 86 and FIGS. 50-55 show a conductive plate 88. With the conductive plate 88, the signal contacts 12 are insulated from the conductive plate 88 by an insulating plug 90 which prevents the signal contacts 12 from electrically shorting to the conductive plate 88. The plug 90 has two apertures 44, one for each signal contact 12. As described above with reference to FIGS. 36-38, the twin-axial cable plug 90 can be anchored by any conceivable means, such as by press fit, as shown in FIG. 52, adhesive, or capture.

Figure 50:
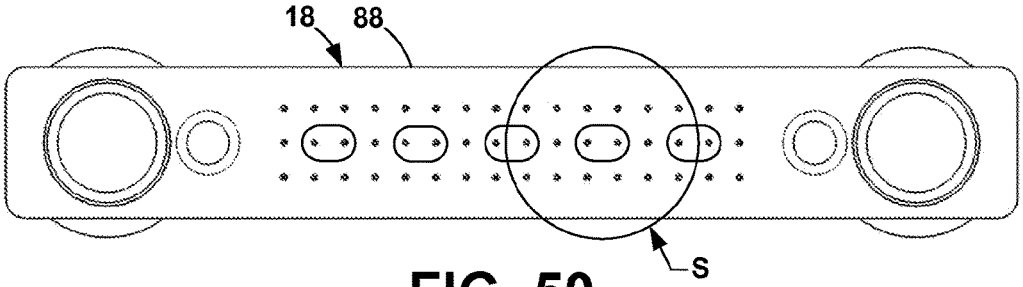
FIG. 50 is bottom view of the cable termination assembly of FIG. 42 with twin-axial cables, a conductive plate, and insulating plugs for the signal contacts.
Figure 51:
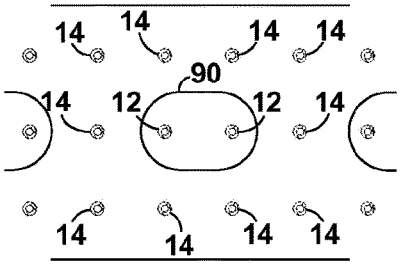
FIG. 51 is a detail view of the bottom of the twin-axial cable termination assembly of FIG. 50 taken at S.
Figure 52:
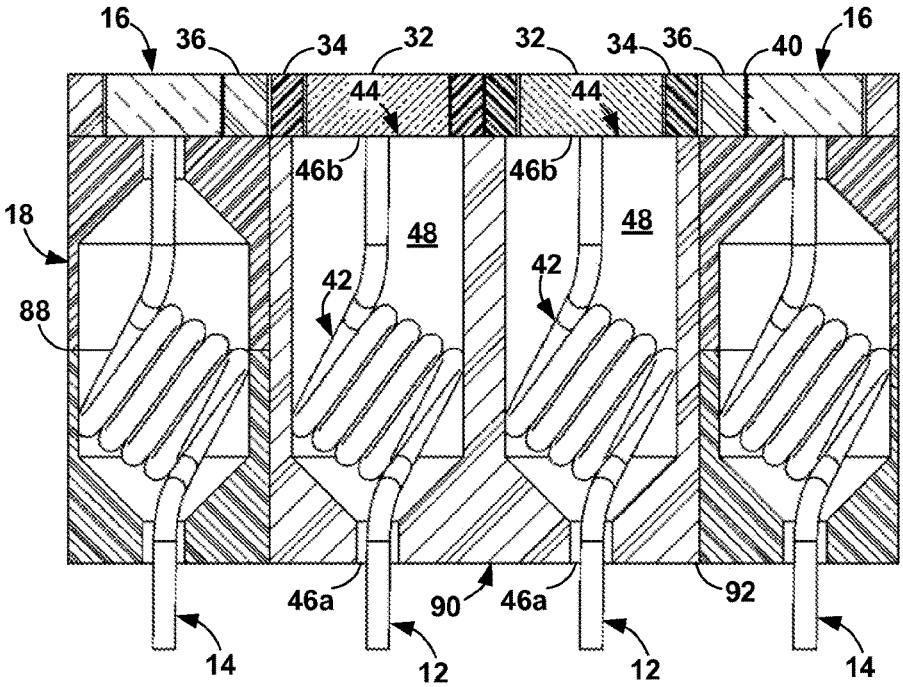
FIG. 52 is a detailed view of FIG. 46 taken at P showing the twin-axial cable termination using skewed coil contacts, a conductive plate, and insulating plugs for the signal contacts.
Figure 53:
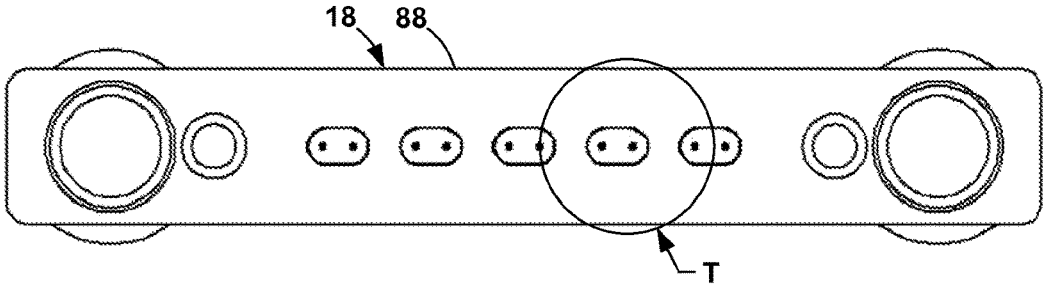
FIG. 53 is a bottom view of an alternative cable termination assembly of FIG. 42 with twin-axial cables, a conductive plate, and insulating plugs for the signal contacts.
Figure 54:
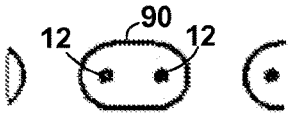
FIG. 54 is a detail view of the bottom of the alternative twin-axial cable termination assembly of FIG. 53 taken at T.
Figure 55:
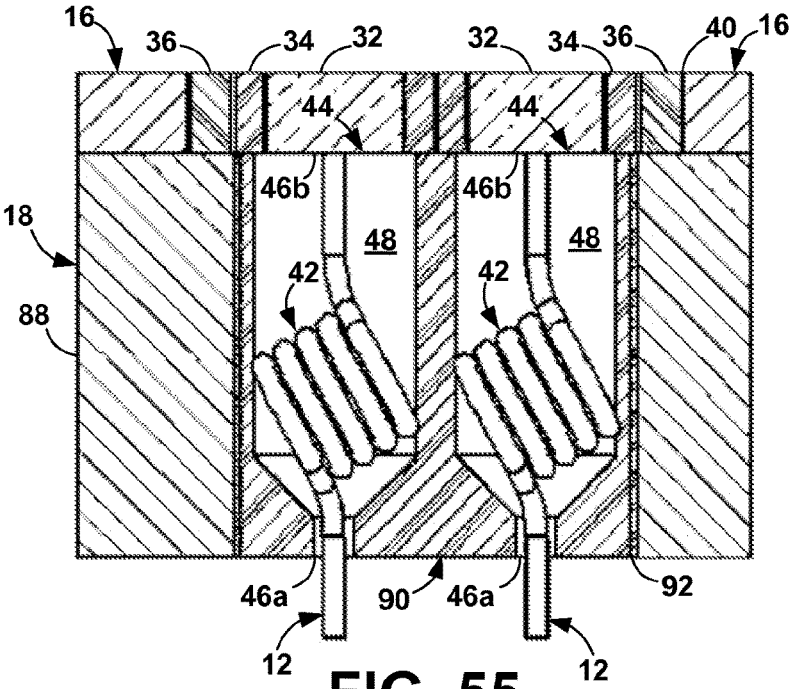
FIG. 55 is a detailed view of FIG. 46 taken at P showing the alternative twin-axial cable termination of FIG. 53.

FIGS. 53-55 show an alternative to the configuration of FIGS. 50-52. This configuration does not use ground contacts, only signal contacts 12. The ground signal conducts directly through the conductive plate 88 to the device 2.

The present specification describes a number of different compliant contacts that can be used in the present invention. These are merely examples. The present invention contemplates that any form of compliant contact that has the appropriate characteristics for the particular application can be used. In addition, the present specification contemplates that different types of contacts can be use in the same assembly. For example, a skewed coil contact can be used as the signal contact and a circular conductive rubber contact can be used as the ground contact.

The present invention produces a controlled-impedance, compliant cable to device interface which can be less than 1 mm thick (the length of the compliant contacts 12, 14) and mimics the controlled-impedance environment of the cable 30, thereby ensuring the highest possible signal rates through the termination.

The present invention can also produce a controlled-impedance device to device interface because the cables 30 can have terminators 10 at both ends.

When working with very high frequencies, for example, frequencies in the Gigahertz range and above, electrical cable lengths are very critical. In order to maintain phase synchronization between signals on different cables, the cables must have as close to the exact same length, mechanically and electrically, as is practical. The present specification describes a method and apparatus for assembling cables 202 to the anchor block 200 so that the cables 202 are the same length to within a very small tolerance, on the order of 0.001 inch for cables 202 that are 6 inches long from the cable connector 204 to the block face 206. The present method can be used for cables of any length. Longer cables result in larger tolerances. At a given temperature, a cable length can be controlled to within 0.03% to 0.05% of the cable's overall length.

Figure 56:
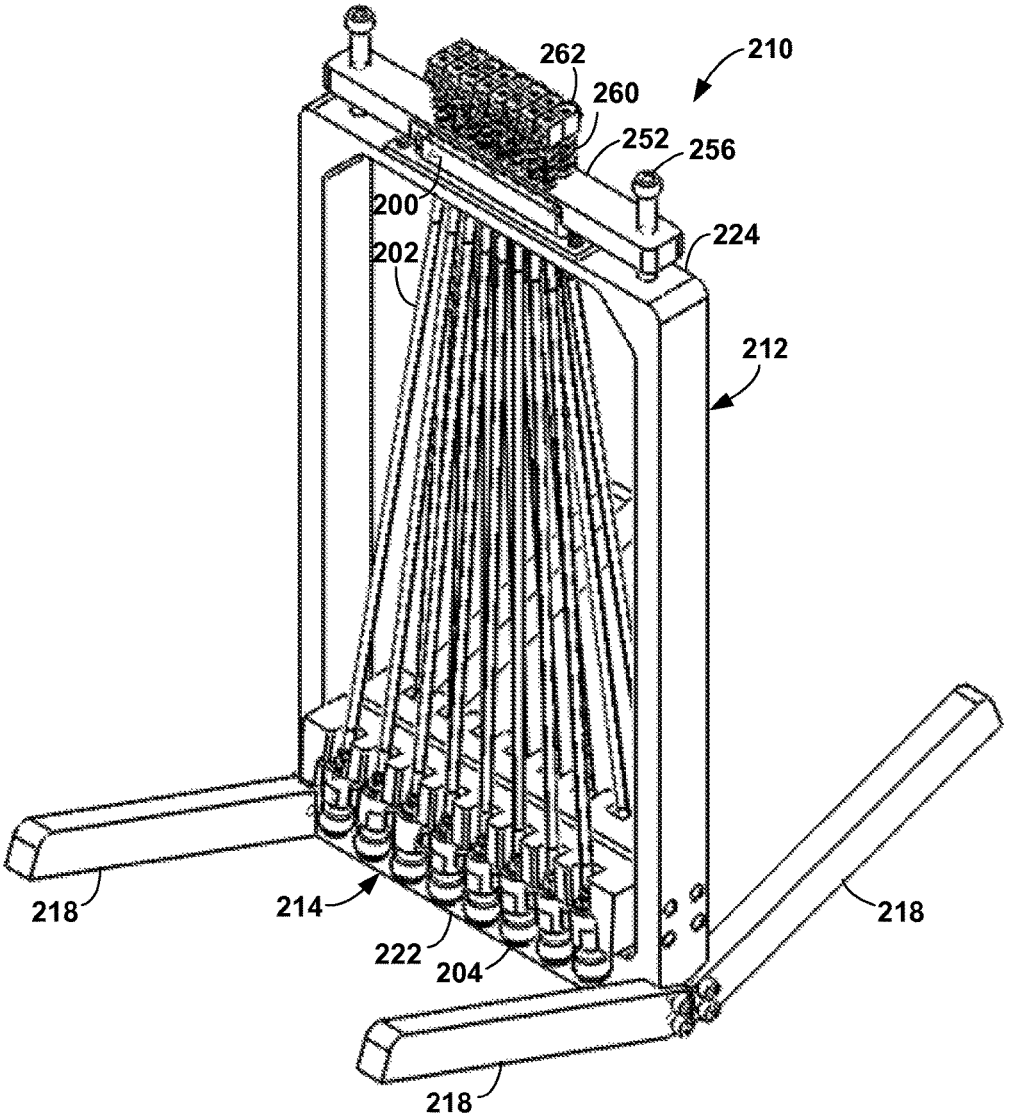
FIG. 56 is an isometric view of a soldering fixture of the present invention with cables and anchor block.
Figure 57:
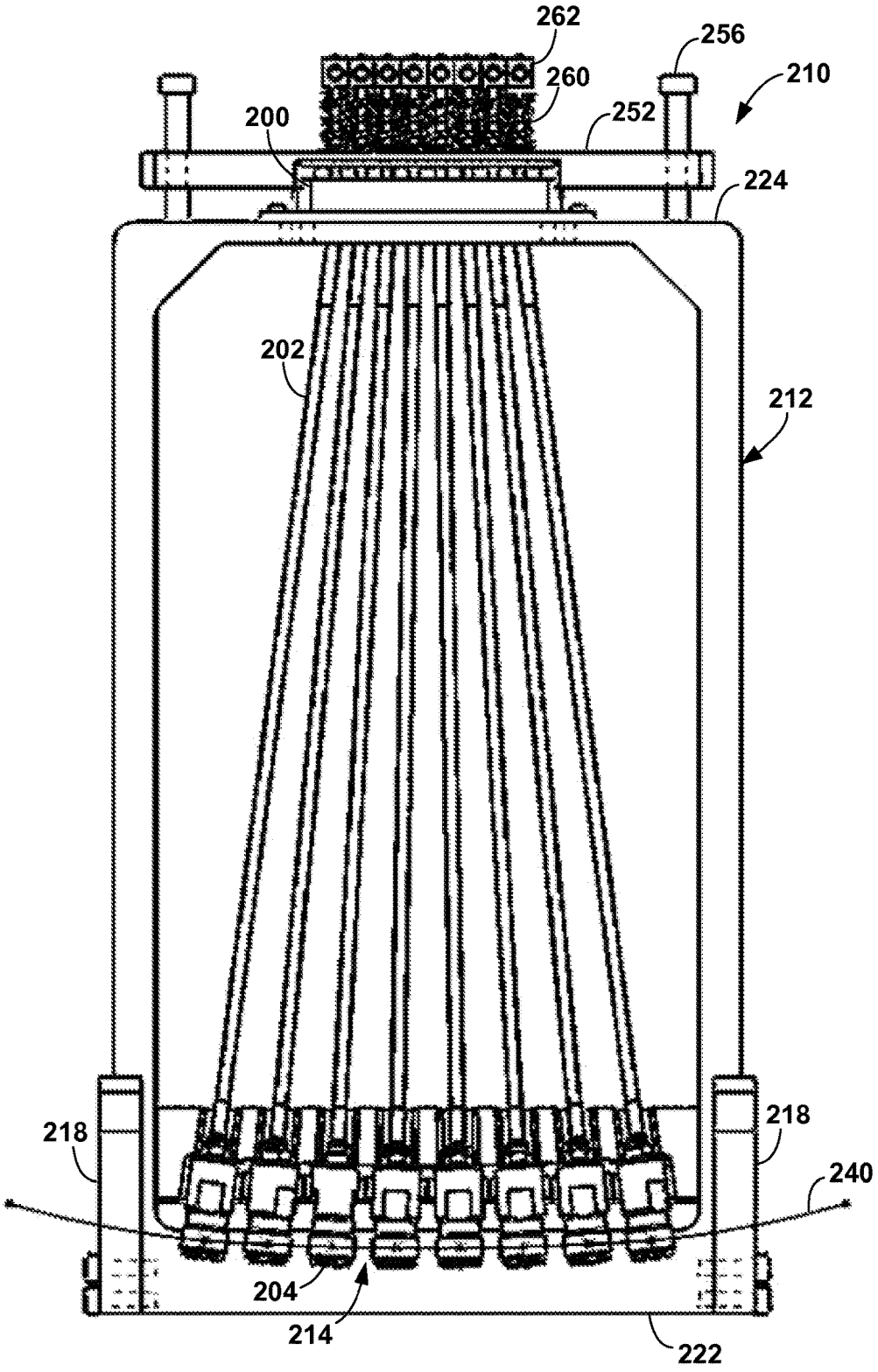
FIG. 57 is a front view of the fixture of FIG. 56.
Figure 58:
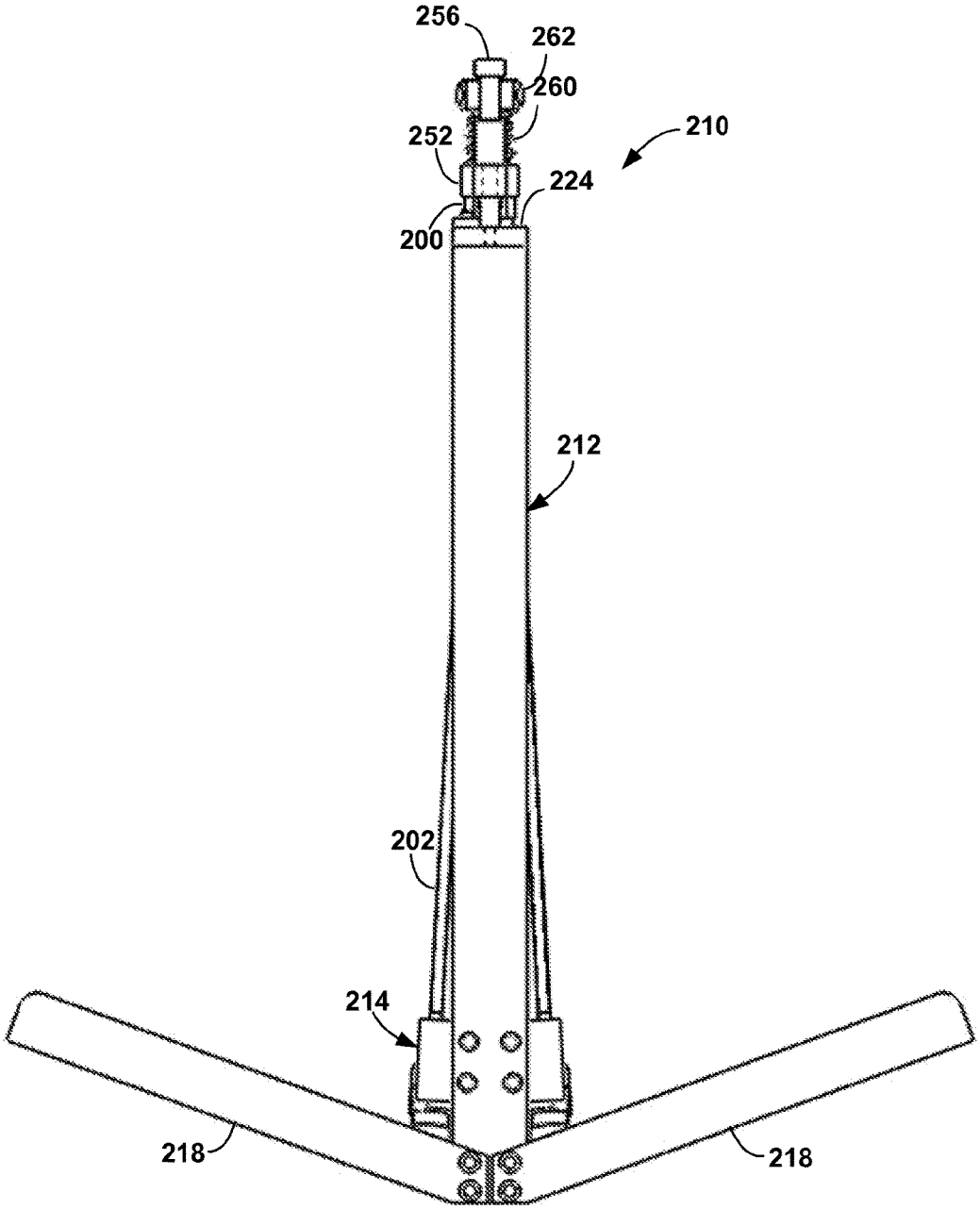
FIG. 58 is a side view of the fixture of FIG. 56.

To facilitate the method, a soldering fixture 210 is used. The fixture includes a frame 212, a connector jig 214, a block jig 216, and legs 218. FIGS. 56-58 illustrate a fixture 210 for use with 16 cables 202 and a rectangular solid anchor block 200 for two rows of cables 202. The fixture 210 can be modified for a different number of cables, different shape anchor block 200, different cable connector 204, different cable length, etc.

The frame 212 is generally rectangular and stands vertically. The connector jig 214 is mounted to the lower cross piece 222 of the frame 212 inside the frame 212. The block jig 216 is mounted to the upper cross piece 224 of the frame 212 outside of the frame 212. Four legs 218 extend from the bottom corners of the frame 212 in generally opposite directions. The legs 218 are angled from the frame 212 by at least 10° from horizontal so that they prevent the frame 212 from falling over but allow the user to tilt the frame 212. The preferred angle is about 20° so that the frame can be tilted between 70°, 90°, and 110° from vertical to facilitate use, as described below. The present invention contemplates that the angle of the legs 218 can vary from application to application.

Figure 59:
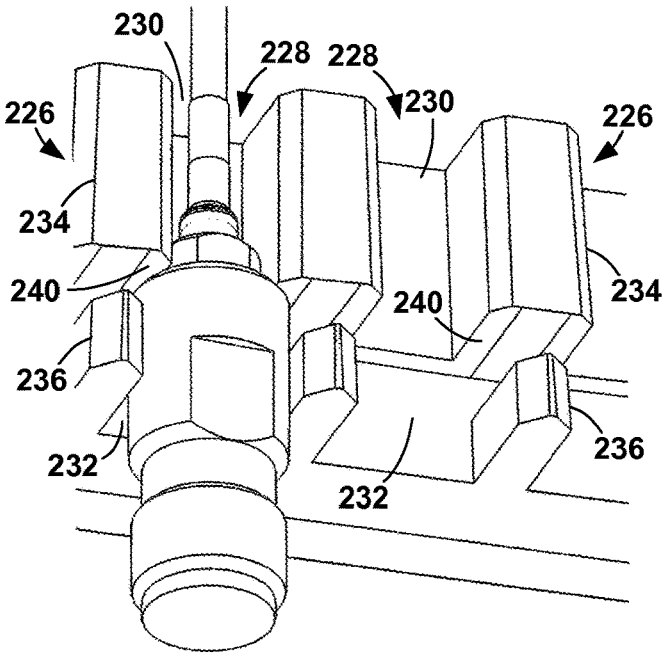
FIG. 59 is a detail view of the connector jig of FIG. 57.

The fixture 210 locks the connector 204 of each cable 202 at a fixed distance away from where the other end of the cable 202 will be soldered to the anchor block 200. The connector jig 214 locks the connectors 204 and can be designed appropriately for any particular type of connector 204. FIG. 59 shows a portion of a connector jig 214 for locking coaxial connectors. There is a connector securement 226 for each cable 202. The securement 226 includes a channel 228 with an upper narrow section 230 for the cable 202 and a lower wide section 232 for the connector 204. The narrow section 230 is defined by outwardly extending upper fingers 234. The wide section 232 is defined by outwardly extending lower fingers 236. When there is upward tension on the cable 202, the connector 204 catches on the bottom surface 238 of the upper fingers 234.

Because the distance (pitch) between cables 202 at the anchor block 200 is smaller than the diameter of the connectors 204, the cables 202 cannot be secured parallel to each other to achieve equal length. To solve this problem, the connector jig 214 locks the connectors 204 in an upwardly open arc 240 so that the cables 202 are the same length to the anchor block 200.

Figure 60:
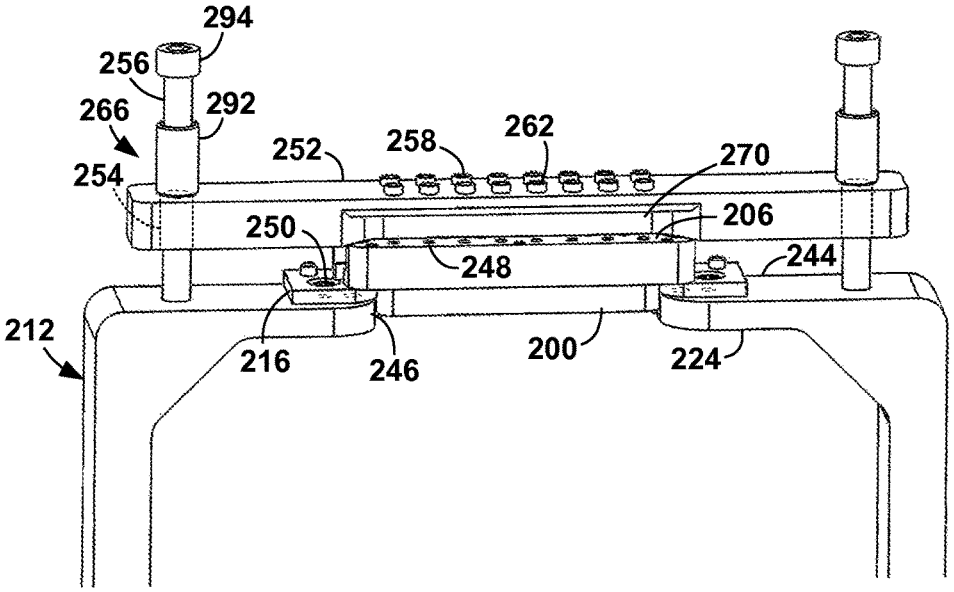
FIG. 60 is a detail view of the block jig and tensioning plate of FIG. 57 with the anchor block attached.

As shown in FIG. 60, the block jig 216, a C-shaped component, is secured by screws 250 to the top surface 244 of the upper cross piece 224 of the frame 212, straddling a C-shaped cutout 246. The anchor block 200 is secured by screws 242 to the block jig 216 such that the anchor block face 206 is up and straddles the cutout 246, which provides access to the cable holes 248 in the anchor block 200.

A tensioning plate 252 is mounted to the upper cross piece 224. There are threaded holes 254 at each end of the tensioning plate 252 into which the jack screws 256 are threaded. The tensioning plate 252 is placed over the anchor block face 206 and the jack screws 256 are turned into the holes 254 so that the tensioning plate 252 rests on the anchor block face 206. The tensioning plate 252 has a cable hole 258 for each cable 202 that is aligned with the anchor block cable hole 248 for the same cable 202. Optionally, the tensioning plate 252 is machined out above the anchor block 200, as at 270, to facilitate access to the face 206.

Each cable 202 is trimmed so that it is at least 1.4 inches longer that the assembled length of the cable 202. The cable 202 is stripped at the end so that the length from the connector 204 to the stripped portion remains constant. The non-stripped portion of the cable 202 extends into the anchor block hole 248 approximately 0.06 inches.

Figure 61:
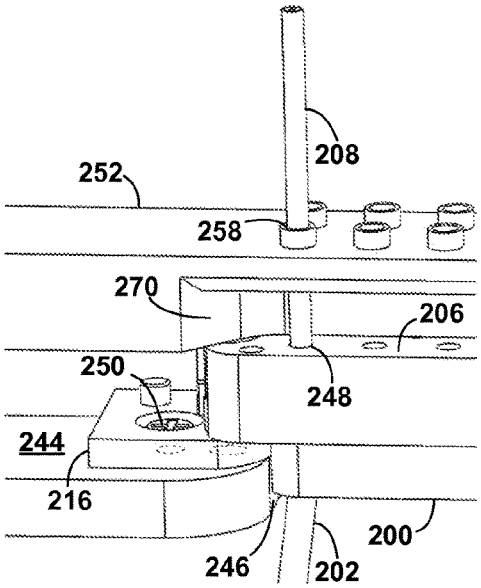
FIG. 61 is a detail view of a cable threaded through the block and tensioning plate.

As shown in FIG. 61, after trimming, each cable 202 is fed through the hole 248 in the anchor block 200 corresponding to the connector securement 228 into which the cable connector 204 will be placed and through the corresponding cable hole 258 in the tensioning plate 252.

Figure 62:
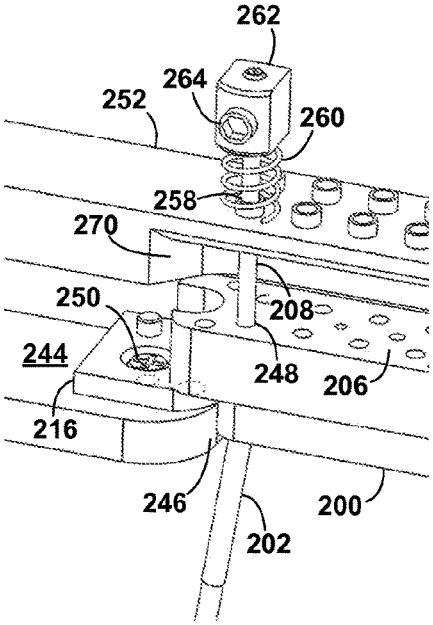
FIG. 62 is a detail view of the screw and collar installed on a cable.

As shown in FIG. 62, a coil spring 260 is placed on each cable 202 and a collar 262 is placed over each cable 202 so it touches the spring 260. Alternatively, the spring 260 and collar 202 can be a unified component. A set screw 264 is turned into the collar 262 to tightly secure the collar 262 to the cable 202.

Figure 63:
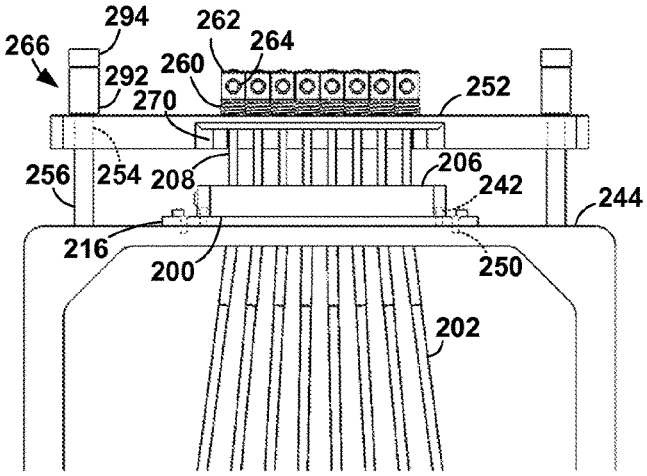
FIG. 63 is a detail view of the tensioning plate in tension.

The connectors 204 are placed into the corresponding securement 228 and the two jack screws 256 are tightened until the cables 202 have enough tension to be pulled against their securements 226, making sure that the cables 202 are straight between the connector 204 and the anchor block 200 with no kinks or bends. Optional stops 266 prevent the jack screws 256 from being tightened too much. In the illustrated configuration, the stops 266 are spacers 292 on the jack screws 256 between the tensioning plate 252 and the jack screw heads 294, as shown in FIG. 63.

The springs 260 independently keep each cable 202 tight so that the distance from the connector 204 anchor block face 206 remains consistent for all of the cables 202.

Each cable shield 208 is soldered to the anchor block 200 such that the solder flows into the hole 248. The angled legs 218 allowing the user to tilt the fixture 210 permit easier access to each side of the anchor block 200 for soldering.

After the solder and anchor block 200 have cooled sufficiently, the jack screws 256 are loosened until tension on the springs 260 is released. The collars 262, springs 260, and tensioning plate 252 are removed. The anchor block 200 is removed from the frame 212 and the connectors 204 are removed from the connector jig 214. The excess cable is cut off.

Next, the anchor block face 206 is finished smooth and evenly flat. There are a number of ways known in the art to accomplish this, including sanding, milling, planing, skiving, and broaching. Once the cables 202 are secured in the anchor block 200, any conceivable method can be used to dress the face 206 of the anchor block 200 which achieves the desired surface finish and/or planarity.

Thus it has been shown and described a controlled-impedance cable termination and a method and apparatus for attaching controlled-impedance cables to the termination. Since certain changes may be made in the present disclosure without departing from the scope of the present invention, it is intended that all matter described in the foregoing specification and shown in the accompanying drawings be interpreted as illustrative and not in a limiting sense.

What is claimed is:

[1. A controlled-impedance cable termination for a controlled-impedance cable, the cable comprising at least one center conductor, a dielectric surrounding the at least one center conductor, and a ground shield surrounding the dielectric, the termination comprising:

(a) an anchor block having a face and at least one cable through hole, the cable through hole having an opening in the face;

(b) a electrically-conductive ferrule adapted to be installed on the ground shield at the end of the cable, the ferrule adapted to be captured in the cable through hole;

(c) a plate attached to the face, the plate having a face surface abutting the face and a device surface, the plate including at least one signal through aperture extending between the face surface and the device surface, the signal aperture having a signal block opening adjacent to and aligned with the cable through hole opening, the signal aperture having a signal device opening in the device face; and (d) an electrically-conductive compliant signal contact captured within each of the at least one signal aperture, the signal contact having a signal block contact point extending from the signal block opening and a signal device contact point extending from the signal device opening.]

[2. The cable termination of claim 1 wherein the anchor block is composed of an electrically-nonconductive material.]

[3. The cable termination of claim 1 wherein the ferrule is captured in the cable through hole by a press fit.]

[4. The cable termination of claim 1 wherein the ferrule is removably captured in the cable through hole.]

[5. The cable termination of claim 1 wherein the plate is composed of an electrically insulating material and the cable termination further comprises:

(a) the plate including a plurality of ground through apertures spaced from and surrounding the at least one signal aperture, each of the ground apertures extending between the face surface and the device surface, the ground apertures each having an anchor block opening in the face surface and a ground device opening in the device face; and (b) an electrically-conductive compliant ground contact captured within each of the ground apertures, the ground contact having an anchor block contact point extending from the anchor block opening into electrical contact with the ferrule and a ground device contact point extending from the ground device opening.]

[6. The cable termination of claim 1 wherein the plate is composed of an electrically-conductive material and the signal aperture is within an electrically-nonconductive plug in the plate.]

[7. The cable termination of claim 6 further comprising:

(a) the plate including a plurality of ground through apertures spaced from and surrounding the at least one signal aperture, each of the ground apertures extending between the face surface and the device surface, the ground apertures each having an anchor block opening in the face surface and a ground device opening in the device face; and (b) an electrically-conductive compliant ground contact captured within each of the ground apertures, the ground contact having a ferrule contact point extending from the anchor block opening into electrical contact with the ferrule and a ground device contact point extending from the ground device opening.]

[8. A controlled-impedance cable termination assembly comprising:

(a) at least one controlled-impedance cable having at least one center conductor, a dielectric surrounding the center conductor, and a ground shield surrounding the dielectric;

(b) an anchor block having a face and at least one cable through hole, the cable through hole having an opening in the face;

(c) an electrically-conductive ferrule installed on the ground shield at the end of the cable to form a ferrule/cable assembly, the ferrule/cable assembly captured in the cable through hole such that the cable end is flush with the block face;

(d) a plate attached to the face, the plate having a face surface abutting the face and a device surface, the plate including at least one signal through aperture extending between the face surface and the device surface, the signal aperture having a signal block opening adjacent to and aligned with the cable center conductor, the signal aperture having a signal device opening in the device face; and (e) an electrically-conductive compliant signal contact captured within each of the at least one signal aperture, the signal contact having a signal block contact point extending from the signal block opening into electrical contact with the center conductor and a signal device contact point extending from the signal device opening.]

[9. The cable termination of claim 8 wherein the anchor block is composed of an electrically-nonconductive material.]

[10. The cable termination of claim 8 wherein the ferrule is captured in the cable through hole by a press fit.]

[11. The cable termination of claim 8 wherein the ferrule is removably captured in the cable through hole.]

[12. The cable termination of claim 8 wherein the plate is composed of an electrically-insulating material and the cable termination further comprises:

(a) the plate including a plurality of ground through apertures spaced from and surrounding the at least one signal aperture, each of the ground apertures extending between the face surface and the device surface, the ground apertures each having an anchor block opening in the face surface and a ground device opening in the device face; and (b) an electrically-conductive compliant ground contact captured within each of the ground apertures, the ground contact having an anchor block contact point extending from the anchor block opening into electrical contact with the ferrule and a ground device contact point extending from the ground device opening.]

[13. The cable termination of claim 8 wherein the plate is composed of an electrically-conductive material and the signal aperture is within an electrically-nonconductive plug in the plate.]

[14. The cable termination of claim 13 further comprising:

(a) the plate including a plurality of ground through apertures spaced from and surrounding the at least one signal aperture, each of the ground apertures extending between the face surface and the device surface, the ground apertures each having an anchor block opening in the face surface and a ground device opening in the device face; and (b) an electrically-conductive compliant ground contact captured within each of the ground apertures, the ground contact having an anchor block contact point extending from the anchor block opening into electrical contact with the ferrule and a ground device contact point extending from the ground device opening.]

*15. A controlled-impedance cable termination for a controlled-impedance cable, the cable comprising at least one center conductor, a dielectric surrounding the at least one center conductor, and a ground shield surrounding the dielectric, the termination comprising:*

*(a) an anchor block having a block face and a cable through hole, the cable through hole having an opening in the block face;*

*(b) an electrically-conductive ferrule adapted to be installed on the ground shield at the end of the cable, the ferrule having a ferrule face and adapted to be captured in the cable through hole;*

*(c) a plate composed of an electrically-conductive material and attached to the block face, the plate having a face surface abutting the block face and a device surface;*

*(d) a signal through hole in the plate extending between the face surface and the device surface;*

*(e) an insulating plug within the signal through hole, the insulating plug extending between the face surface and the device surface and having a signal through aperture with a signal block opening adjacent to and aligned with the cable through hole opening and a signal device opening in the device surface; and*

*(f) an electrically-conductive compliant skewed coil signal contact captured within the signal through aperture, the signal contact having a signal block contact point extending from the signal block opening and a signal device contact point extending from the signal device opening.*

*16. The controlled-impedance cable termination of claim 15 wherein the ferrule is removably captured in the cable through hole.*

*17. The controlled-impedance cable termination of claim 15 further comprising a plurality of ferrules and a plurality of cable though holes, each of the plurality of ferrules adapted to be captured in one of the plurality of cable through holes such that the faces of the plurality of ferrules are coplanar.*

*18. The controlled-impedance cable termination of claim 15 further comprising:*

*(a) a plurality of ground through apertures in the plate spaced from and surrounding the signal aperture, each of the plurality of ground through apertures extending between the face surface and the device surface, the plurality of ground through apertures each having a ground block opening in the face surface and a ground device opening in the device surface; and*

*(b) an electrically-conductive compliant skewed coil ground contact captured within each of the ground apertures, the ground contact having a ferrule contact point extending from the ground block opening into electrical contact with the ferrule and a ground device contact point extending from the ground device opening.*

*19. The controlled-impedance cable termination of claim 15 wherein the plate is comprised of two sheets.*

*20. The controlled-impedance cable termination of claim 19 wherein the two sheets are mirror images, each including half of the signal through hole.*

*21. The controlled-impedance cable termination of claim 19 wherein one sheet has a majority of the signal through hole.*

*22. The controlled-impedance cable termination of claim 15 wherein the insulating plug is comprised of two parts.*

*23. A controlled-impedance cable termination assembly comprising:*

*(a) a controlled-impedance cable having at least one center conductor, a dielectric surrounding the at least one center conductor, and a ground shield surrounding the dielectric;*

*(b) an anchor block having a block face and a cable through hole, the cable through hole having an opening in the block face;*

*(c) an electrically-conductive ferrule having a ferrule face and installed on the ground shield at the end of the cable to form a ferrule/cable assembly, the ferrule/cable assembly captured in the cable through hole such that the cable end is flush with the block face;*

*(d) a plate composed of an electrically-conductive material and attached to the block face, the plate having a face surface abutting the block face and a device surface;*

*(e) a signal through hole in the plate extending between the face surface and the device surface;*

*(f) an insulating plug within the signal through hole, the insulating plug extending between the face surface and the device surface and having a signal through aperture with a signal block opening adjacent to and aligned with the cable center conductor and a signal device opening in the device surface;*

*(g) an electrically-conductive compliant skewed coil signal contact captured within the signal through aperture, the signal contact having a signal block contact point extending from the signal block opening into electrical contact with the cable center conductor and a signal device contact point extending from the signal device opening.*

*24. The controlled-impedance cable termination assembly of claim 23 wherein the ferrule is removably captured in the cable through hole.*

*25. The controlled-impedance cable termination assembly of claim 23 further comprising a plurality of ferrule/cable assemblies and a plurality of cable though holes, each of the plurality of ferrule/cable assemblies captured in one of the plurality of cable through holes such that the faces of the plurality of ferrules are coplanar.*

*26. The controlled-impedance cable termination assembly of claim 23 further comprising:*

*(a) a plurality of ground through apertures in the plate spaced from and surrounding the signal aperture, each of the plurality of ground through apertures extending between the face surface and the device surface, the*

*plurality of ground through apertures each having a ground block opening in the face surface and a ground device opening in the device surface; and*

(*b*) *an electrically-conductive compliant skewed coil ground contact captured within each of the plurality of ground through apertures, the ground contact having a ground block contact point extending from the ground block opening into electrical contact with the ferrule and a ground device contact point extending from the ground device opening.*

*27. The controlled-impedance cable termination assembly of claim 23 wherein the plate is comprised of two sheets.*

*28. The controlled-impedance cable termination assembly of claim 27 wherein the two sheets are mirror images, each including half of the signal through hole.*

*29. The controlled-impedance cable termination assembly of claim 27 wherein one sheet has a majority of the signal through hole.*

*30. The controlled-impedance cable termination assembly of claim 23 wherein the insulating plug is comprised of two components.*

* * * * *